US009845102B2

(12) United States Patent
Bastien et al.

(10) Patent No.: US 9,845,102 B2
(45) Date of Patent: Dec. 19, 2017

(54) COLLAPSIBLE STROLLER MECHANISM

(71) Applicant: MONAHAN PRODUCTS, LLC, Hingham, MA (US)

(72) Inventors: Richard M. Bastien, Cumberland, RI (US); Carl J. Sukeforth, Milton, MA (US); Ward A. Fritz, Westwood, MA (US); Robert D. Monahan, Norwell, MA (US)

(73) Assignee: MONAHAN PRODUCTS, LLC, Hingham, MA (US)

( * ) Notice: Subject to any disclaimer, the term of this patent is extended or adjusted under 35 U.S.C. 154(b) by 77 days.

(21) Appl. No.: 14/806,583

(22) Filed: Jul. 22, 2015

(65) Prior Publication Data
US 2017/0021852 A1   Jan. 26, 2017

(51) Int. Cl.
*B62B 3/00* (2006.01)
*B62B 7/08* (2006.01)

(52) U.S. Cl.
CPC ..................... *B62B 7/08* (2013.01)

(58) Field of Classification Search
CPC .... B62B 7/08; B62B 7/00; B62B 7/06; B62B 7/083; B62B 7/008; B62B 7/04; B62B 7/062; B62B 7/068; B62B 2205/06; B62B 2205/20; B62B 2205/23
See application file for complete search history.

(56) References Cited

U.S. PATENT DOCUMENTS

| 4,111,454 | A | * | 9/1978 | Kassai | ...................... B62B 7/08 280/649 |
| 4,765,645 | A | * | 8/1988 | Shamie | ...................... B62B 7/08 280/42 |
| 4,986,564 | A | * | 1/1991 | Liu | ......................... B62B 9/104 280/47.4 |

(Continued)

FOREIGN PATENT DOCUMENTS

| CN | 201784652 U | 4/2011 |
| CN | 203739941 U | 7/2014 |

(Continued)

OTHER PUBLICATIONS

International Search Report and Written Opinion of the International Searching Authority from corresponding PCT/US2016/043126 dated Oct. 4, 2016.

*Primary Examiner* — James M Dolak
(74) *Attorney, Agent, or Firm* — Lando & Anastasi, LLP

(57) ABSTRACT

In accordance with some aspects of the present disclosure, there is provided a foldable stroller frame comprising a first side frame member, a second side frame member, a middle frame member, and a sliding mechanism configured to slide along the middle frame member. First and second cross frame members may connect the sliding mechanism to the first and second side frame members. In some examples, the first and second cross frame members may comprise a curved portion proximate the connection with the side frame members. The sliding member may comprise an upper portion and a lower portion. In some examples, spring- (Continued)

biased tongues disposed in the lower portion may bias the upper portion. In some examples third and fourth cross frame members may connect the first side frame member and the second side frame member to a foot pedal that may be disposed on the middle frame member.

21 Claims, 19 Drawing Sheets

(56) References Cited

U.S. PATENT DOCUMENTS

| | | | | |
|---|---|---|---|---|
| 5,288,098 | A * | 2/1994 | Shamie | B62B 7/083 280/42 |
| 6,811,178 | B2 * | 11/2004 | Tomasi | B62B 7/064 280/642 |
| 7,108,275 | B2 * | 9/2006 | Yeh | B62B 7/08 280/647 |
| 7,267,358 | B2 * | 9/2007 | Chen | A47C 4/18 280/642 |
| 7,434,827 | B2 * | 10/2008 | Yeh | B62B 7/08 280/639 |
| 7,571,926 | B2 * | 8/2009 | Huang | B62B 7/068 280/642 |
| 7,731,220 | B2 * | 6/2010 | Chen | B62B 7/08 280/639 |
| 8,740,243 | B2 * | 6/2014 | Li | B62B 7/083 280/42 |
| 8,894,090 | B1 * | 11/2014 | Chen | B62B 7/086 280/47.38 |
| 8,944,457 | B2 * | 2/2015 | Rembisz | B62B 7/06 280/47.38 |
| 9,114,820 | B1 * | 8/2015 | Dillner | B62B 9/102 |
| 9,505,423 | B2 * | 11/2016 | Thorne | B62B 7/08 |
| 9,561,816 | B2 * | 2/2017 | Dowd | B62B 7/08 |
| 9,561,817 | B2 * | 2/2017 | Laffan | B62B 9/26 |
| 9,604,660 | B1 * | 3/2017 | Zuo | B62B 7/12 |
| 2008/0143082 | A1 * | 6/2008 | Chen | B62B 7/08 280/650 |
| 2012/0025491 | A1 | 2/2012 | Li | |

FOREIGN PATENT DOCUMENTS

| | | |
|---|---|---|
| CN | 104290794 A | 1/2015 |
| EP | 1614605 B1 | 12/2006 |

* cited by examiner

COLLAPSIBLE STROLLER MECHANISM

BACKGROUND

Aspects and examples of the present disclosure are directed generally to child conveyance devices, for example, strollers, and to frame structures and mechanisms to support the stroller and to assist the folding of such strollers. A stroller is generally a chair-like carriage with wheels for transporting a baby or child. Some strollers may include a single seat for receiving a single passenger for transporting. Other strollers may include two or more seats.

SUMMARY

In accordance with some aspects of the present disclosure, there is provided a foldable stroller frame comprising a first side frame member, a second side frame member, a middle frame member, a sliding mechanism configured to slide along the middle frame member, a first cross frame member connecting the sliding mechanism to the first side frame member, and a second cross frame member connecting the sliding mechanism to the second side frame member, wherein at least one of the first and second cross frame members comprises a curved portion proximate the connection with the first or second side frame members.

In some examples, the sliding mechanism comprises an upper portion and a lower portion that may be adjacent one another when the foldable stroller frame is in an expanded position.

In some examples, the foldable stroller frame further comprises a foot pedal configured to slide along the middle frame member.

In some examples, the foot pedal is connected to at least one of the upper portion and/or the lower portion by a connecting member having a first end coupled to the foot pedal and a second end coupled to at least one of the upper portion and/or the lower portion.

In some examples the foldable stroller frame further comprises a retractable pin disposed on the middle frame member for temporarily impeding the movement of the sliding mechanism on the middle frame member.

In some examples the foldable stroller frame further comprises a connector connecting the retractable pin to a release handle, the connector configured to temporarily disengage the pin when an action is performed on the release handle.

In some examples, the foldable stroller frame further comprises a third cross frame member connecting the foot pedal to the first side frame member and a fourth cross frame member connecting the foot pedal to the second side frame member.

In some examples, at least one of the third and the fourth cross frame members comprises a curved portion proximate the connection with the first or second side frame members.

In some examples, the foldable stroller frame further comprises a first support frame member connecting the sliding mechanism to the third cross frame member and a second support frame member connecting the sliding mechanism to the fourth cross frame member.

In some examples, the first and second cross frame members connect to the upper portion of the sliding mechanism and the first and second support members connect to the lower portion of the sliding mechanism.

In some examples, the first, second, third, and fourth cross frame members are either substantially perpendicular to the middle frame member or form an obtuse angle from vertical with the middle frame member when the foldable stroller frame is in an expanded position.

In some examples, the foldable stroller frame further comprises third and fourth support frame members connecting the first and second side frame members to the foot pedal.

In some examples, the third and fourth support frame members comprise an internal pivot mechanism disposed along the length of the third and fourth support frame members.

In some examples, the lower surface of the upper portion of the sliding mechanism includes one or more engagement features corresponding to one or more engagement features on the top surface of the lower portion of the sliding mechanism, the one or more engagement features configured to matingly engage with one another when the foldable stroller frame is in an expanded position.

In accordance with some aspects of the present disclosure, there is provided a foldable stroller comprising a sliding mechanism disposed on at least one frame member, including a first portion and a second portion disposed adjacent one another, and being configured to slide along the at least one frame member, and a foot pedal configured to slide along the at least one frame member.

In some examples, the foot pedal is connected to at least one of the first portion and/or the second portion by a connecting member having a first end coupled to the foot pedal and a second end coupled to at least one of the first portion and/or the second portion.

In some examples, the foldable stroller further comprises a first side frame member, a second side frame member, and a middle frame member.

In some examples, the foldable stroller further comprises a first cross frame member connecting the first side frame member to the sliding mechanism and a second cross frame member connecting the second side frame member to the sliding mechanism.

In some examples, the foldable stroller further comprises a third cross frame member connecting the first side frame member to the foot pedal and a fourth cross frame member connecting the second side frame members to the foot pedal.

In some examples, the foldable stroller further comprises a first support frame member connecting the third cross frame member to the sliding mechanism and a second support frame member connecting the fourth cross frame member to the sliding mechanism.

In some examples, the first and the second cross frame members connect to the upper portion of the sliding mechanism and the first and second support frame members connect to the lower portion of the sliding mechanism.

In some examples, at least one of the first, second, third, and/or fourth cross frame members comprises a curved portion proximate the connection with the first and/or the second side frame members.

In some examples, at least one frame member includes a retractable pin configured to impede the movement of at least one of the upper portion and/or the lower portion of the sliding mechanism.

In some examples, the foldable stroller further comprises a connector connecting the pin to an actuator, the connector disengaging the pin when an action is performed on the actuator.

In some examples, the foldable stroller further comprises third and fourth support frame members connecting the first and second side frame members to the foot pedal.

In some examples, the third and fourth support frame members comprise an internal pivot mechanism disposed along the length of the third and fourth support frame members.

In some examples, the upper portion of the sliding mechanism includes one or more engagement features and the lower portion of the sliding mechanism includes one or more engagement features corresponding to the one or more engagement features on the upper portion, the one or more engagement features configured to matingly engage with one another when the foldable stroller is in a folded and/or unfolded position.

In accordance with some aspects of the present disclosure, there is provided a mechanism for facilitating the folding of a stroller frame, the mechanism comprising an upper portion slidably disposed on a frame member and a lower portion slidably disposed on the frame member and having at least one spring-biased tongue, the at least one spring-biased tongue being configured to apply a biasing force to the upper portion.

In some examples, the mechanism further comprises a cavity defined in the upper portion, the at least one spring-biased tongue being configured to extend into at least a portion of the cavity when the stroller frame is in an at least partially folded position.

In some examples the at least one spring-biased tongue is at least partially disposed within a cavity defined in the lower portion when the stroller frame is in a folded position.

In some examples, the at least one spring-biased tongue is attached to at least one helical metal spring.

In some examples, the at least one spring-biased tongue is visible within the lower portion when the stroller frame is in an unfolded position.

In some examples, the upper portion and the lower portion are adjacent one another when the stroller frame is in an unfolded position.

In some examples, the mechanism comprises a foot pedal configured to slide along the frame member.

In some examples, the foot pedal is connected to at least one of the upper portion and/or the lower portion by a connecting member having a first end coupled to the foot pedal and a second end coupled to at least one of the upper portion and/or the lower portion.

In some examples, the mechanism further comprises a retractable pin disposed on the frame member for temporarily impeding the movement of the upper portion and/or the lower portion on the frame member.

In some examples, the mechanism further comprises a connector connecting the retractable pin to a release handle, the connector configured to temporarily disengage the pin when an action is performed on the release handle.

In some examples, the lower surface of the upper portion includes one or more engagement features corresponding to one or more engagement features on the top surface of the lower portion, the one or more engagement features configured to matingly engage with one another when the stroller frame is in an unfolded position.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
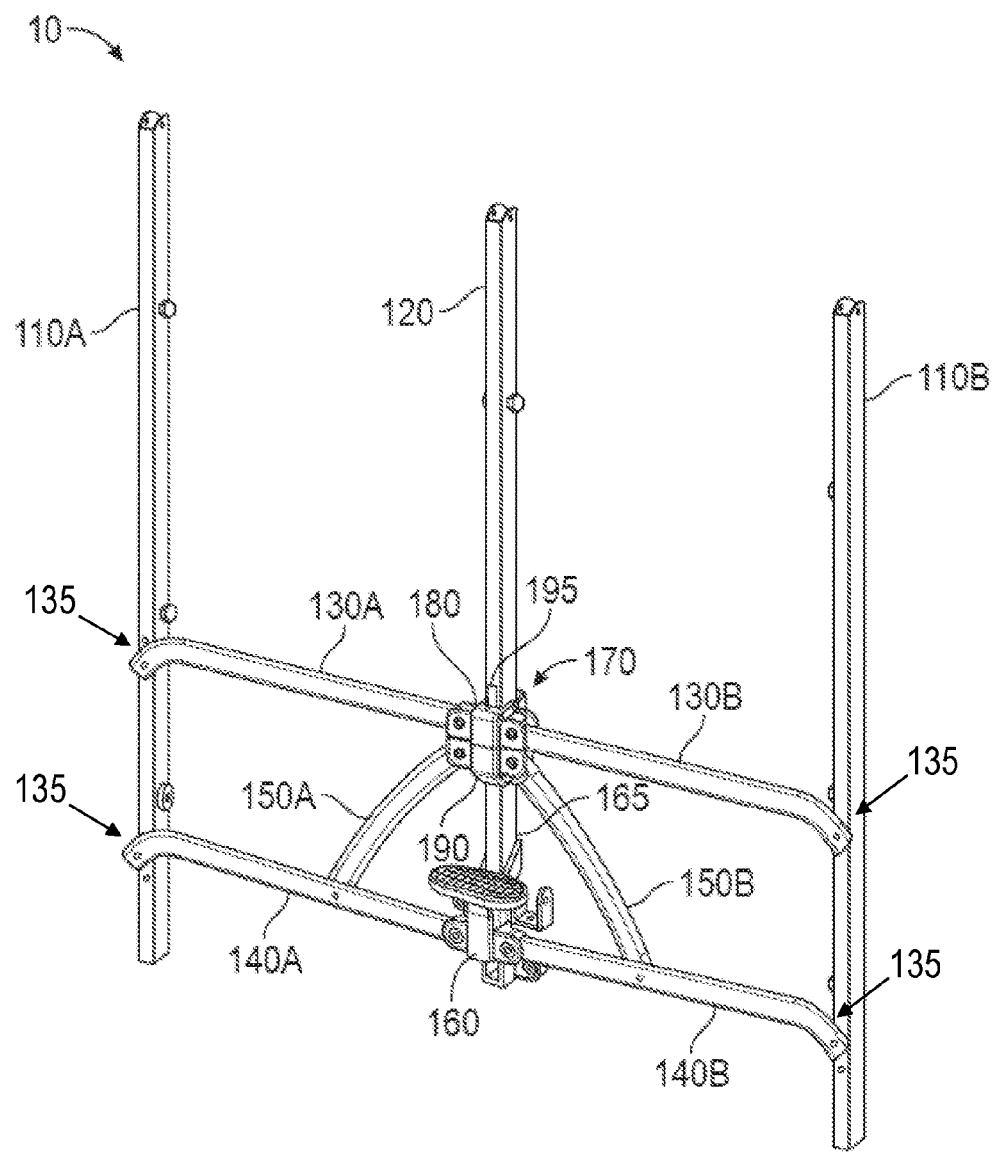
FIG. 1 is an isometric view of a portion of a stroller frame in accordance with some examples of the present disclosure.

The disclosure is not limited in its application to the details of construction and the arrangement of components set forth in the following description or illustrated in the drawings. The disclosure is capable of other examples and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional terms.

Parents or caregivers of young children or babies may transport a child in child conveyance devices, such as strollers. Such devices are more convenient to transport or store if the devices can collapse or otherwise be configured to take up less space when the child is not in the device. Child conveyance devices may be configured to collapse by, for example, pulling a release handle and/or pushing up on a foot pedal. As used herein, the terms "child conveyance device" and "stroller" include any apparatus, mobile or stationary, in which a child may be placed wherein it may be desirable to include elements that fold, collapse or move.

Some aspects and examples of the present disclosure include a stroller with frame members that facilitate the folding of one or more portions of the stroller into a collapsed state. In some examples, the configuration of one or more frame members put the frame under tension and facilitates the folding of the stroller.

Some aspects and examples of the present disclosure include a sliding mechanism for use on a child conveyance device which facilitates the folding of one or more portions of the stroller into a collapsed state. In some examples, a sliding mechanism is coupled to the frame of a stroller in a manner such that the sliding mechanism applies a desired force to a portion of the frame upon initiating collapse of the stroller into a folded configuration, facilitating the collapse of the stroller into the folded configuration. In some examples, provision of a device containing a sliding mechanism on a stroller helps to initiate and/or assist with folding the child conveyance device, making the child conveyance device easier for a user to fold.

When expanding a stroller device for use, a parent or caregiver may be unaware of whether the stroller has been properly expanded into a locked and/or fully expanded state. As a result, parents or caregivers may mistakenly believe that the child conveyance device is in a locked and/or fully expanded state, and they may place a child in the device, only to have the device collapse. Child conveyance devices in accordance with various examples disclosed herein may provide a visual indication of whether the child conveyance device has been properly expanded into a locked and/or fully expanded state.

Referring to FIGS. 1 and 2A-2C, in one example, a stroller frame 10 includes a first side frame member 110A and a second side frame member 110B. In some examples, the first side frame member 110A and the second side frame member 110B are parallel to one another. The stroller frame 10 further includes a middle frame member 120. In some examples, the first side frame member 110A and the second side frame member 110B are also parallel to the middle frame member 120. In some examples, the middle frame member 120 is located between and approximately equidistant from the first side frame member 110A and the second side frame member 110B. In some examples, the first side frame member 110A, the second side frame member 110B, and the middle frame member 120 are substantially co-planar. In some examples, one or more of the first side frame member 110A, the second side frame member 110B, and the middle frame member 120 may be disposed at an angle and/or may be non co-planar with one or more other of the first side frame member 110A, the second side frame member 110B, and the middle frame member 120.

The first side frame member 110A, the second side frame member 110B, and the middle frame member 120 may include substantially linear members as illustrated in FIG. 1 and FIGS. 2A-2C. In other examples, one or more of the first side frame member 110A, the second side frame member 110B, and the middle frame member 120 may include portions which are not linearly aligned with other portions thereof. In some examples, the first side frame member 110A, the second side frame member 110B, and the middle frame member 120 are substantially vertically oriented when in use, and in other examples, one or all of the first side frame member 110A, the second side frame member 110B, and the middle frame member 120 are angled relative to vertical when in use either toward a rear of the child conveyance device or toward a front of the child conveyance device. In some examples, one or more of the first side frame member 110A, the second side frame member 110B, and the middle frame member 120 are angled from vertical to different extents than one or more others of the first side frame member 110A, the second side frame member 110B, and the middle frame member 120.

One or more of the first side frame member 110A, the second side frame member 110B, and the middle frame member 120 may comprise substantially rigid members. One or more of the first side frame member 110A, the second side frame member 110B, and the middle frame member 120 may comprise solid members or may comprise conduits, for example, hollow tubes or hollow conduits having square or rectangular cross sections, or cross sections of other geometrical shapes. One or more of the first side frame member 110A, the second side frame member 110B, and the middle frame member 120 may comprise metal, for example, aluminum or steel, a reinforced or non-reinforced plastic material, wood, or any other material known in the art suitable for members of a frame of a child conveyance device.

The middle frame member 120 may include a relatively planar surface upon which a sliding mechanism 170 may slide. Sliding mechanism 170 may comprise an upper assembly 180 and a lower assembly 190. The upper assembly 180 and lower assembly 190 may slide along middle frame member 120 independent of one another. A first upper cross frame member 130A may connect upper assembly 180 to first side frame member 110A. A second upper cross frame member 130B may connect upper assembly 180 to second side frame member 110B. A third cross frame member 140A may connect first side frame member 110A to a manual actuator, illustrated in FIG. 1 as foot pedal 160. A fourth cross frame member 140B may connect second side frame member 110B to the foot pedal 160. The third cross frame member 140A may be a lower cross frame member disposed directly or offset beneath the first upper cross frame member 130A when the stroller frame 10 is in an expanded state. The fourth cross frame member 140B may be a lower cross frame member disposed directly or offset beneath the second upper cross frame member 130B when the stroller frame 10 is in an expanded state.

Figure 2A:
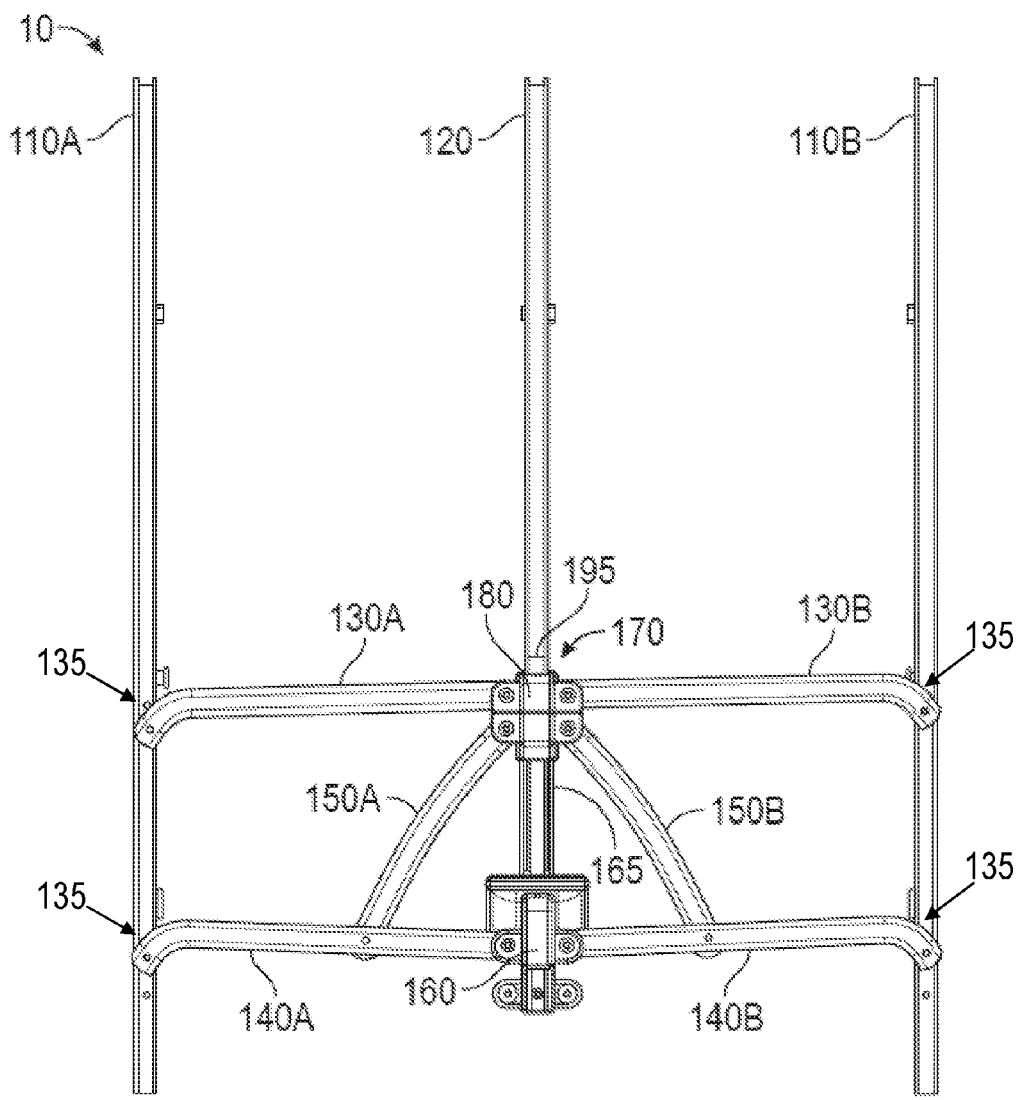
FIG. 2A is an elevational view of a portion of a stroller frame in accordance with some examples of the present disclosure.

In some examples, upper cross frame members 130A and 130B and upper cross frame members 130A and 130B and lower cross frame members 140A and 140B may include curved end portions 135, as shown, for example, in FIGS. 1 and 2A. A curvature of 10 to 80 degrees may be used on one or more end portions of cross frame members 130A or 130B or lower cross frame members 140A or 140B. The curved end portions 135 of 130A, 130B, 140A or 140B may be proximate to the connections with side frame members 110A and 110B, as shown, for example, in FIG. 2A. In other examples, the curved end portions 135 of 130A, 130B, 140A or 140B may be proximate to the connections with upper assembly 180. The curved end portions 135 of upper cross frame members 130A and 130B and lower cross frame members 140A and 140B put the frame under tension when in an expanded state. When frame 10 is released from its fully-extended and locked position, the tension helps facilitate the folding of the stroller.

Figure 2B:
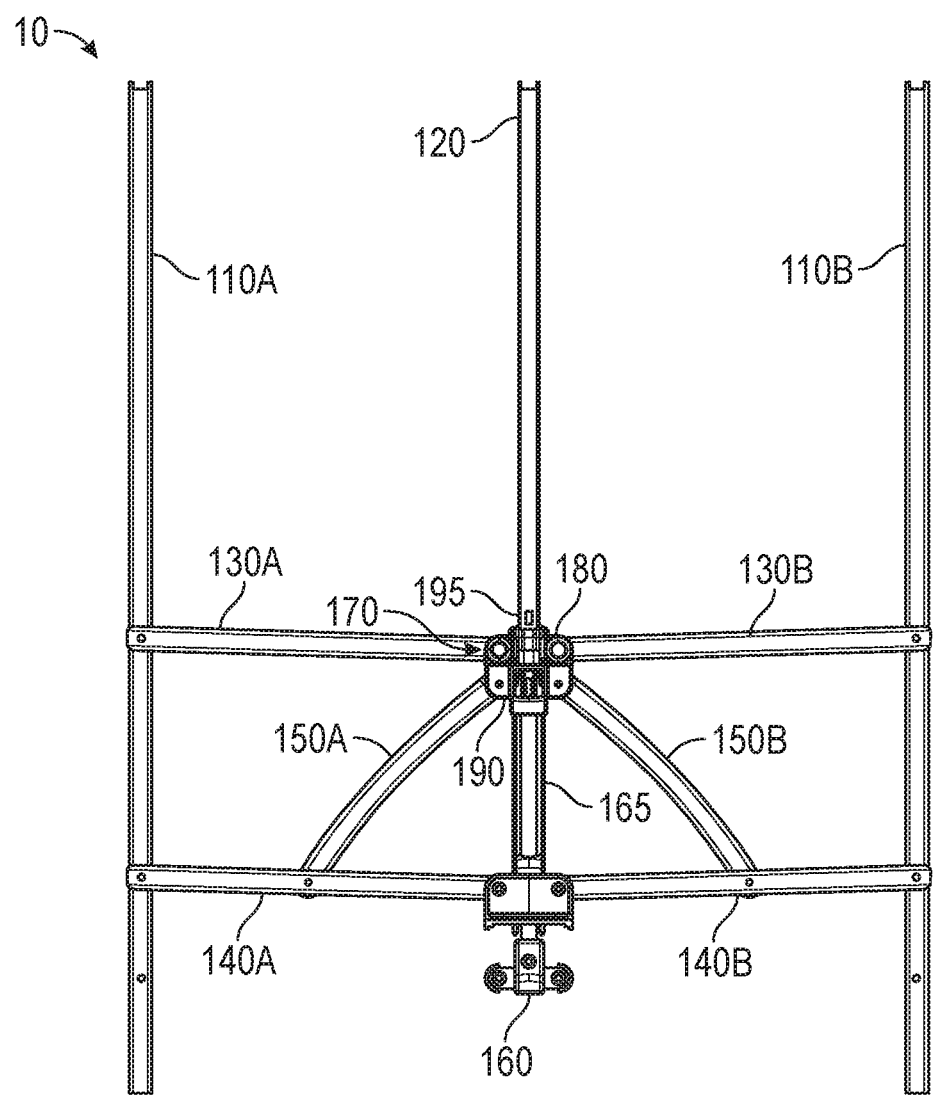
FIG. 2B is an elevational view of a portion of a stroller frame in accordance with some examples of the present disclosure.
Figure 2C:
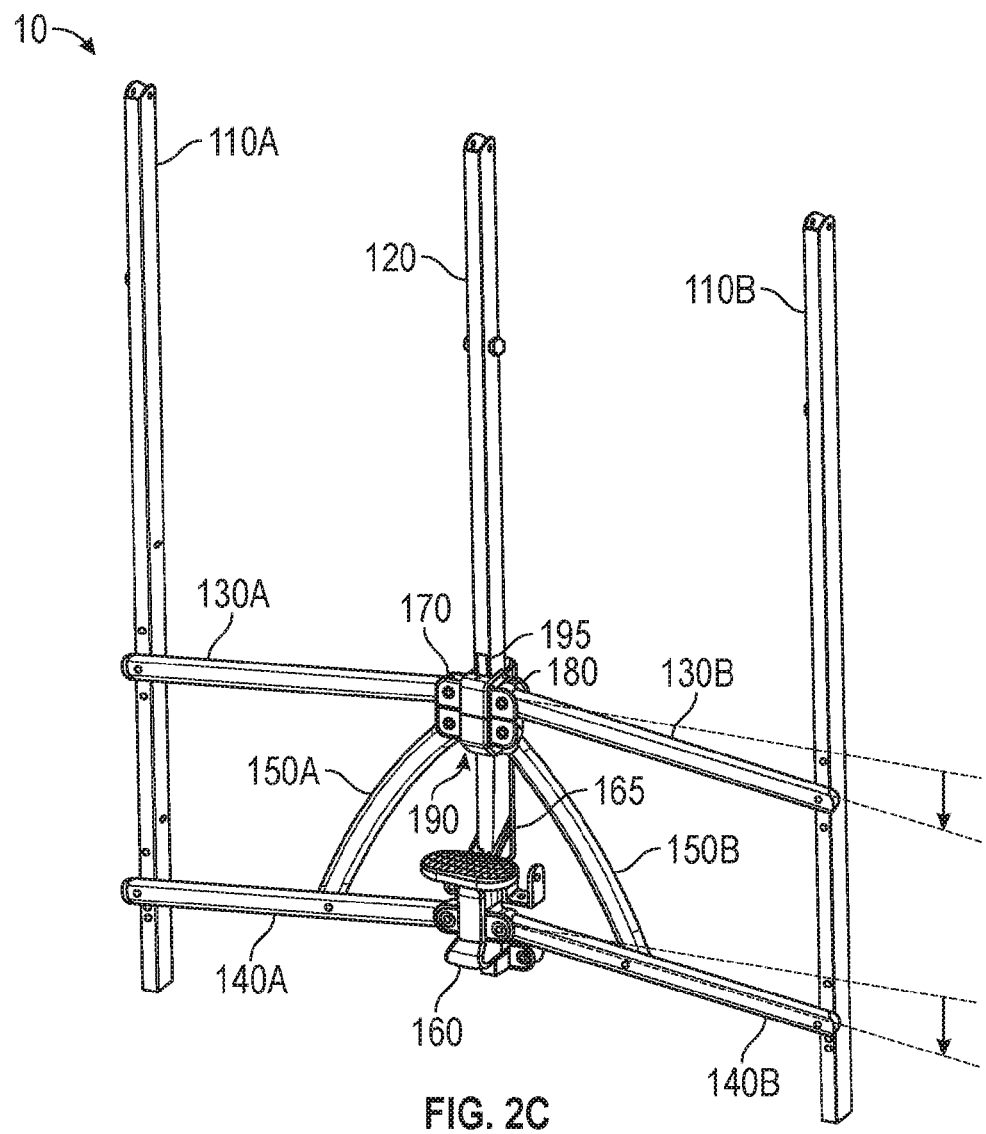
FIG. 2C is an isometric view of a portion of a stroller frame in accordance with some examples of the present disclosure.

In other examples, upper cross frame members 130A and 130B and lower cross frame members 140A and 140B may be generally perpendicular to first and second side frame members 110A and 110B and middle frame member 120 when frame 10 is in an extended position, as shown, for example, in FIG. 2B. In other examples, upper cross frame members 130A and 130B and lower cross frame members 140A and 140B may be angled upward toward middle frame member 120 when frame 10 is in an extended position, as shown, for example, in FIG. 2C. In yet further examples, upper cross frame members 130A and 130B and lower cross frame members 140A and 140B may comprise a series of bends, altering the path upper cross frame members 130A and 130B and lower cross frame members 140A and 140B, while maintaining the tension in the frame for collapsing the stroller.

First support member 150A may connect lower assembly 190 to third cross frame member 140A to stiffen the frame assembly. Second support member 150B may connect lower assembly 190 to fourth cross frame member 140B to stiffen the frame assembly. A connecting member 165 may pass through an aperture in lower assembly 190 or in front of lower assembly 190 and connect the manual actuator (e.g., foot pedal 160) to upper assembly 180. The manual actuator may alternatively or additionally include a hand grip, pull rod, or any other structure through which a user may apply a force to the connecting member 165. Alternatively, the connecting member may be disposed at least partially about, around, or on one or more sides of middle frame member 120 or partially or wholly internal to middle frame member 120.

Figure 4A:
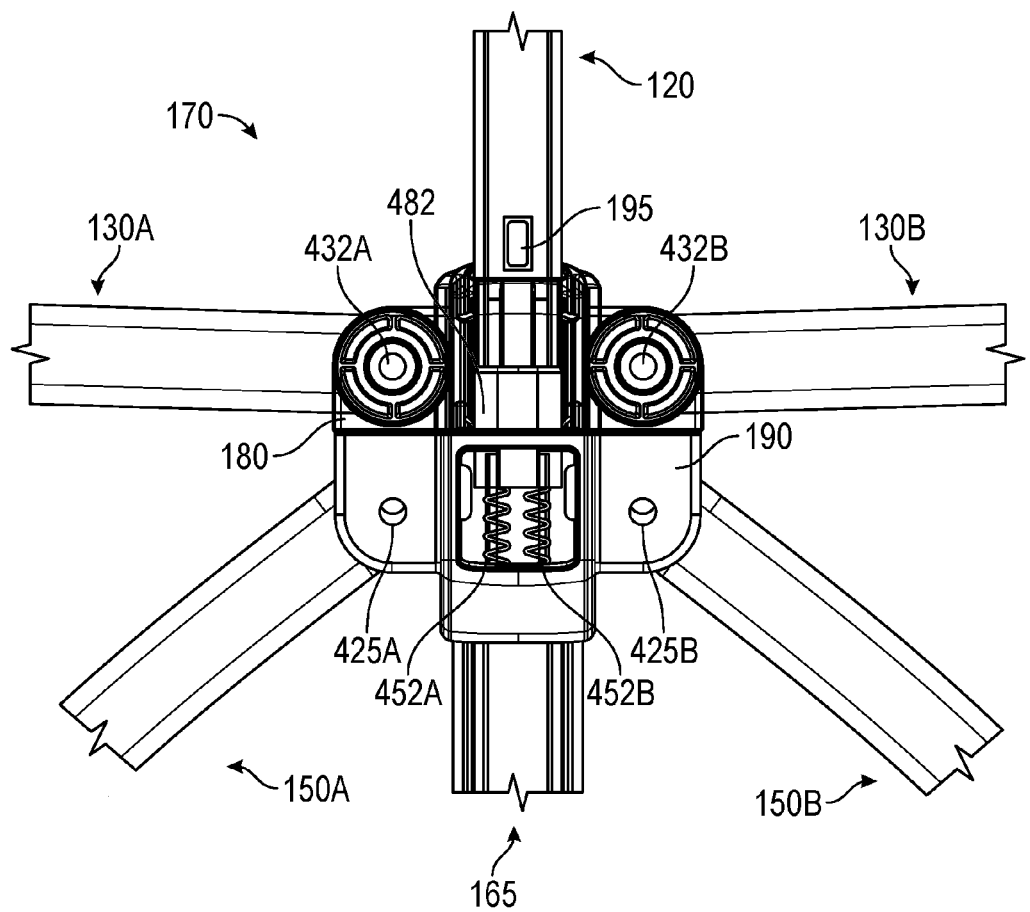
FIG. 4A is a partially cross-sectional view of a sliding mechanism in accordance with some examples of the present disclosure.

In some examples, the upper assembly 180 comprises a cavity. In some examples, the lower assembly 190 comprises one or more spring-biased tongues 482 (see FIG. 4A) configured to extend into at least a portion of the cavity. The one or more spring-biased tongues 482 may be at least partially housed in a cavity in the lower assembly 190. The one or more spring-biased tongues 482 may be biased upward out of the cavity on the lower assembly 190 by one or more biasing elements, for example, one or more springs 452A, 452B as illustrated in FIG. 4A.

Figure 4B:
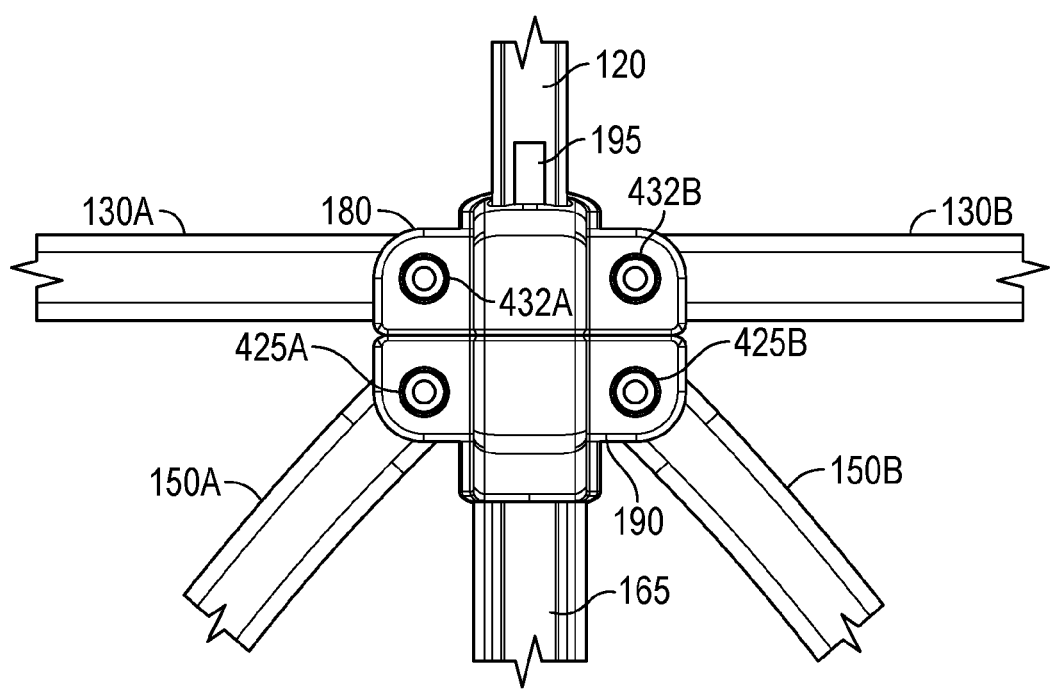
FIG. 4B is a partially cross-sectional view of a sliding mechanism in accordance with some examples of the present disclosure.

In other examples upper assembly 180 of sliding mechanism 170 may not comprise springs as shown, for example, in FIG. 4B. In such examples, sliding mechanism 170 may not include any spring biasing force to assist with collapsing stroller 30. In such examples, sliding mechanism 170 may comprise an upper assembly 180 with a first upper connection point 432A and second upper connection point 432B (described below) for connecting upper assembly 180 to upper cross frame members 130A and 130B. Lower assembly 190 of sliding mechanism 170 may comprise a first lower connection point 425A and a second lower connection point 425B (described below) for connecting lower assembly 190 to first and second support members 150A and 150B. In such examples upper assembly 180 and lower assembly 190 may slide along middle frame member 120 independent of one another.

In some examples, there is provided a visual indication of the position of one or more spring-biased tongues 482. For example, the lower assembly may include a window 583 (see FIG. 5) through which the one or more spring-biased tongues 482 may be visibly discernible when the upper and lower assemblies are mated or in proximity to one another and/or when the frame 10 is in a partially or fully expanded state. The one or more spring-biased tongues 482 may be of a different color, for example, an easily visible color such as fluorescent orange or red, than the lower assembly 190 to make the position of the one or more spring-biased tongues 482 more readily visible in the window 583. In other examples, one or more spring-biased tongues 482 may include a written indication that may be visibly discernible when the upper and lower assemblies are mated or in proximity to one another and/or when the frame 10 is in a partially or fully expanded state. In some examples, one or more spring-biased tongues 482 only partially fills window 583 when the upper and lower assemblies are separated. In some examples, one or more spring-biased tongues 482 completely or substantially completely fills window 583 when the upper and lower assemblies 180, 190 are mated and first spring 552A and second spring 552B are compressed.

In some examples, the sliding mechanism 170 is designed to lock into a position in which the upper assembly 180 engages the lower assembly 190. In the locked position, a lower surface of the upper assembly 180 may be disposed flush against an upper surface of the lower assembly 190. In other examples, there may be a gap between a lower surface of the upper assembly 180 and an upper surface of the lower assembly 190 even when the upper assembly 180 fully engages the lower assembly 190. In other examples, the sliding mechanism 170 may additionally or alternatively be locked by an action performed on the manual actuator, for example, by pushing up and/or twisting a portion or the entirety of foot pedal 160 or by an action performed on a second manual actuator, for example handle 385 discussed below.

A locking or retaining member, for example, pin 195, when engaged or disposed in a locking position and/or an extended position, prohibits the upward movement of upper assembly 180 of sliding mechanism 170 along middle frame member 120. The pin 195 may be disposed within or formed integral with the middle frame member 120 and may be biased or pushed away from an outer surface of the middle frame member 120 into a position extending outward from the middle frame member 120 by a resilient member, for example, a spring or a flexible tab disposed on or within the middle frame member 120. When pin 195 is not engaged or disposed in a locking position and/or an extended position, one or both of the upper assembly 180 and the lower assembly 190 of the sliding mechanism 170 may move upwards along the middle frame member 120 to facilitate the folding or collapse of the stroller. When pin 195 is not engaged, an upward motion and/or a force applied to the manual actuator, for example, foot pedal 160 may facilitate the upward motion of the connecting member 165 and one or both of the upper assembly 180 and the lower assembly 190 of the sliding mechanism 170. Under the influence of the applied force or upward motion of the manual actuator, one or both of the upper assembly 180 and the lower assembly 190 of the sliding mechanism 170 slide up middle frame member 120, assisting the collapsing or folding of the stroller frame 10. In some examples, upper assembly 180 and/or the lower assembly 190 may also include a metal strip within the assembly in order to avoid additional wear and tear that may be caused by pin 195 rubbing against the upper and/or lower assemblies as they pass over pin 195.

As described, frame 10 provides a rigid, collapsible frame that may support additional structural elements for a collapsible stroller. By providing a collapsible frame 10 with three vertical support members, such as side frame members 110A, 110B, and middle frame member 120, frame 10 significantly increases the potential width of a collapsible stroller. For example, frame 10 may support a collapsible frame for a double or triple stroller, in some examples.

Furthermore, examples of frame 10 may also significantly improve the structural support for a stroller along its width, such that additional stroller wheels proximate the middle of the stroller may not be required. Additionally, using examples of frame 10, stroller wheels may be disposed farther from the middle of a stroller, allowing for increased roll stability.

Figure 3A:
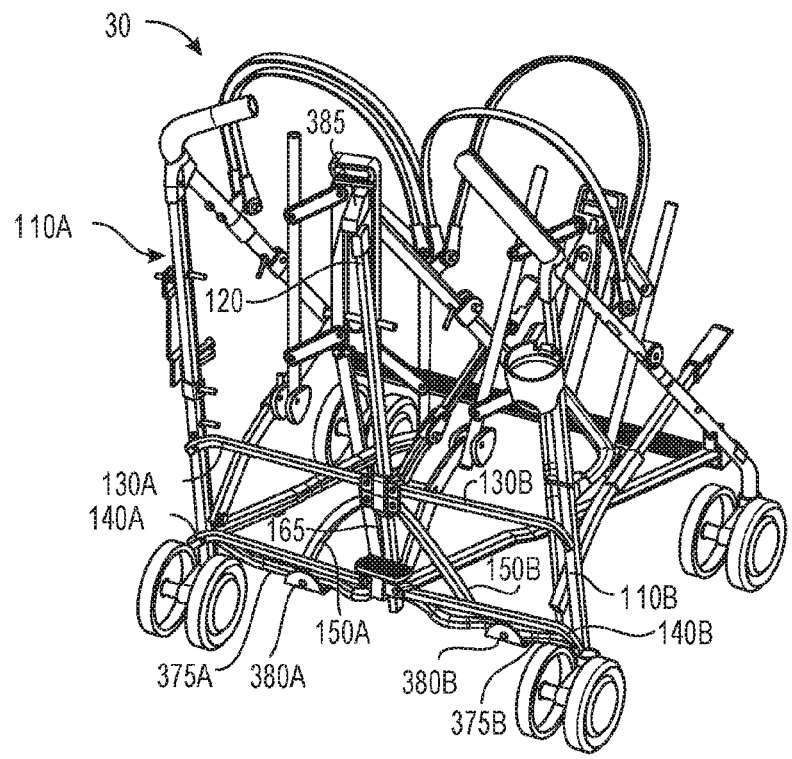
FIG. 3A is an isometric view of a stroller in accordance with some examples of the present disclosure.
Figure 3B:
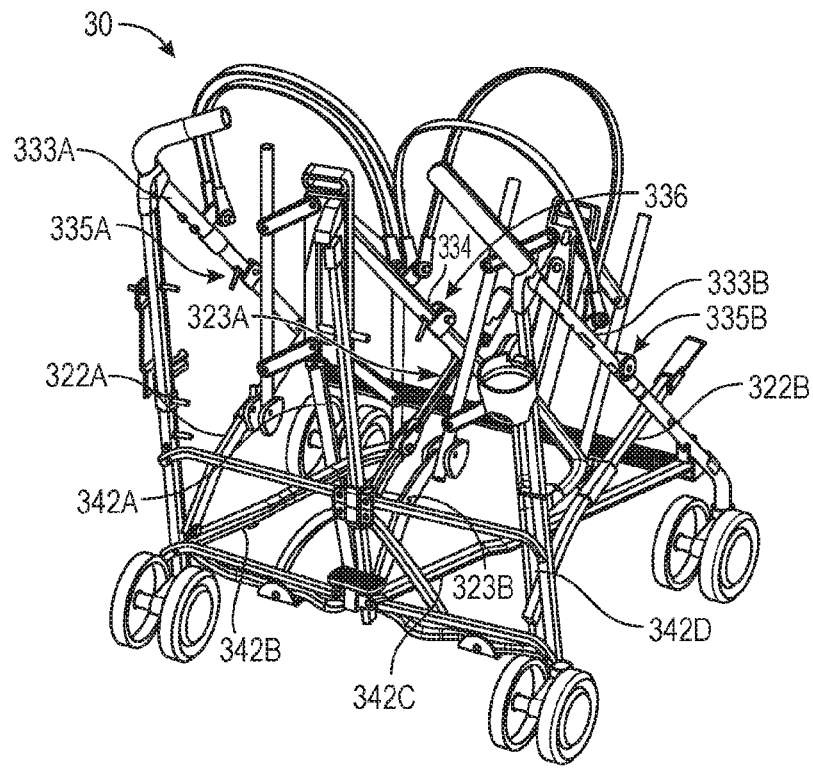
FIG. 3B is another isometric view of the stroller of FIG. 3A.

Referring to FIG. 3A and FIG. 3B, in some examples, the stroller frame 10 is coupled to additional structural elements to form a stroller 30. A third support member 375A may connect first side frame member 110A to foot pedal 160. Third support member 375A may include pivot 380A, allowing third support member 375A to fold upon collapsing or folding the stroller. A fourth support member 375B may connect second side frame member 110B to foot pedal 160. Fourth support member 375B may include pivot 380B, allowing fourth support member 375B to fold upon collapsing or folding the stroller.

Referring now to FIG. 3B, in some examples, stroller frame 30 may include a first side front frame member 333A, a second side front frame member 333B, and/or a middle front frame member 334. In some examples, the first side front frame member 333A and the second side front frame member 333B are parallel to one another. In some examples, first side front frame member 333A and second side front frame member 333B are also parallel to middle front frame member 334. In other examples, middle front frame member 334 is located between and approximately equidistant from first side front frame member 333A and second side front frame member 333B. In some examples, first side front frame member 333A, second side front frame member 333B, and middle frame member 334 are substantially co-planar. In some examples, one or more of first side front frame member 333A, second side front frame member 333B, and middle front frame member 334 may be disposed at an angle and/or be non co-planar with one or more other of the first side front frame member 333A, second side front frame member 333B, and middle front frame member 334. First side front frame member 333A, second side front frame member 333B, and middle front frame member 334 may include substantially linear members as illustrated in FIG. 3B. In other examples, one or more of first side front frame member 333A, second side front frame member 333B, and middle front frame member 334 may include portions which are not linearly aligned with other portions thereof. In some examples one or all of portions or all of first side front frame member 333A, second side front frame member 333B, and middle front frame member 334 are angled relative to vertical when in use either toward a rear of the child conveyance device, as illustrated in FIG. 3B, or toward a front of the child conveyance device. In other examples, at least a portion of first front frame member 333A, second side front frame member 333B, and middle frame member 334 are substantially vertically oriented when in use. In further examples, portions or all of one or more of first side front frame member 333A, second side front frame member 333B, and middle front frame member 334 are angled from vertical to different extents than one or more others of first side front frame member 333A, second side front frame member 333B, and middle front frame member 334.

In some examples, stroller 30 may comprise first bottom cross frame member 342A, second bottom cross frame member 342B, third bottom cross frame member 342C, and fourth bottom cross frame member 342D. First bottom cross frame member 342A may connect first side seat frame member 322A to third cross frame member 140A. Second bottom cross frame member 342B may be connected to third cross frame member 140A and/or first middle seat frame member 323A. Third bottom cross frame member 342C may be connected to second side seat frame member 322B and/or fourth cross frame member 140B. Fourth bottom cross frame member 342D may be connected to second side seat frame member 322B and/or a second middle seat frame member 323B. In some examples, first bottom cross frame member 342A, second bottom cross frame member 342B, third bottom cross frame member 342C, and fourth bottom cross frame member 342D may include pivot elements, for example, pins, rivets, nuts and bolts, ball and socket connectors, or other forms of pivot elements known in the art at areas of connection with any other frame members of the stroller 30.

One or more of first side front frame member 333A, second side front frame member 333B, middle front frame member 334, first bottom cross frame member 342A, second bottom cross frame member 342B, third bottom cross frame member 342C, and fourth bottom cross frame member 342D may comprise substantially rigid members. One or more of first side front frame member 333A, second side front frame members 333B, middle front frame member 334, and first bottom cross frame member 342A, second bottom cross frame member 342B, third bottom cross frame member 342C, and fourth bottom cross frame member 342D may comprise solid members or may comprise conduits, for example, hollow tubes or hollow conduits having square or rectangular cross sections, or cross sections of other geometrical shapes. One or more of first side front frame member 333A, second side front frame member 333B, middle front frame member 334, and first bottom cross frame member 342A, second bottom cross frame member 342B, third bottom cross frame member 342C, and fourth bottom cross frame member 342D may comprise metal, for example, aluminum or steel, a reinforced or non-reinforced plastic material, wood, or any other material known in the art suitable for members of a frame of a child conveyance device.

In some examples, one or more of first side front frame member 333A, second side front frame member 333B, and middle front frame member 334 may include pivot elements 335A, 335B, and 336, respectively, as shown, for example, in FIG. 3B. Pivot elements 335A, 335B, and 336 may comprise any suitable means for rotatable attachment including, for example, pins, rivets, nuts and bolts, ball and socket connectors, or other forms of pivot elements known in the art. In some examples, pivot elements 335A, 335B, and 336 may be located approximately in the middle of first side front frame member 333A, second side front frame member 333B, and middle front frame member 334, respectively, but may be located at any point along first side front frame member 333A, second side front frame member 333B, and middle front frame member 334, in order to configure stroller 30 to collapse in a desired fashion.

In some examples, a second manual actuator, illustrated in FIG. 3A as release handle 385, is connected or mechanically coupled to pin 195 by way of a coupling element. The coupling element may include, for example, a cable, a chain, a string, a rod or any other form of coupling element known in the art which may mechanically connect or couple pin 195 to the second manual actuator. When release handle 385 is pulled, the pin 195 is pulled into or towards the middle frame member 120. Alternatively, the pin 195 may be pulled into middle frame member 120 when the user rotates, twists, pushes or applies force in any other manner to release handle 385. The action of the user on the release handle 385 may cause the pin 195 to recede into the middle frame member 120 or otherwise be displaced, for example, by rotation into a position which provides for upper assembly 180 to freely slide up middle frame member 120.

As shown in FIG. 4A, sliding mechanism 170 may couple to and interact with other elements of the stroller frame 10 in some examples. For example, sliding mechanism 170 may include biasing member or members, for example, springs 452A and 452B attached to the one or more spring-biased tongues 482 of lower assembly 190. Springs 452A and 452B may be compressed when pin 195 protrudes from middle frame member 120, inhibiting movement of upper assembly 180. Alternatively, springs 452A and 452B may expand when pin 195 is pulled into middle frame member 195 or otherwise displaced from a position inhibiting movement of upper assembly 180. The expansion of springs 452A, 452B causes the one or more spring-biased tongues to push upwards against and/or into upper assembly 180, causing a force to be applied to upper assembly 180 and/or lower assembly 190. The force applied to upper assembly 180 and/or lower assembly 190 may displace upper assembly 180 and/or lower assembly 190 up middle frame member 120. Once pin 195 is pulled into middle frame member 120 or otherwise displaced, a user may also push up on foot pedal 160, further facilitating the movement of upper assembly 180 and/or lower assembly 190 up middle frame member 120 and collapsing or folding of the stroller frame 10. The stroller 30 thereafter collapses or folds into an at least partially collapsed or folded configuration.

As shown, for example, in FIG. 4B, in some examples, springs 452A and 452B may be omitted from mechanism 170. In such examples, the one or more tongues 482 (not shown in FIG. 4B) may simply guide upper assembly 180 into proper alignment with lower assembly 190 and/or provide an indication that stroller 30 is in a fully-extended state. In such examples, tongue 482 may not aid in the collapsing and/or expansion processes. In other examples, the one or more tongues 482 may also be omitted from sliding mechanism 170.

Referring to FIGS. 4A-4B, in some examples, upper assembly 180 attaches to first cross frame member 130A and second cross frame member 130B. First cross frame member 130A connects to upper assembly 180 at first upper connection point 432A. In some examples, first cross frame member 130A can connect to upper assembly 180 at first upper connection point 432A by way of a rivet, screw, nut and bolt, pin, peg, ball and socket assembly, or any form of connector known in the art, such that first cross frame member 130A may pivot around first upper connection point 432A. Second cross frame member 130B connects to upper assembly 180 at second upper connection point 432B. In some examples, second cross frame member 130B connects to upper assembly 180 at second upper connection point 432B by way of a rivet, screw, nut and bolt, pin, peg, ball and socket assembly, or any form of connector known in the art, such that second cross frame member 130B may pivot around second upper connection point 432B.

In some examples, lower assembly 190 attaches to first support member 150A and second support member 150B. First support member 150A connects to lower assembly 190 at first lower connection point 425A. In some examples, first support member 150A can connect to lower spring assembly 190 by way of a rivet, screw, nut and bolt, pin, peg, ball and socket assembly, or any form of connector known in the art, such that first support member 150A may pivot around the connection point for lower assembly 190. Second support member 150B connects to lower assembly 190 at second lower connection point 425B. In some examples, second support member 150B can connect to lower assembly 190 by way of a rivet, screw, nut and bolt, pin, peg, ball and socket assembly, or any form of connector known in the art, such that second support member 150B may pivot around the connection point for lower assembly 190.

In some examples, engagement features in upper assembly 180 may mate with engagement features in lower assembly 190 when frame 10 and/or stroller 30 are in an extended position, thereby reducing any lateral movement between upper assembly 180 and lower assembly 190. For example, in some examples, upper assembly 180 may include one or more projections and/or recessed portions on its lower surface that may correspond to one or more projections and/or recessed portions on the upper surface of lower assembly 190. When frame 10 is in an extended position, the one or more corresponding projections and recessed portions on upper assembly 180 and lower assembly 190 may matingly couple, thereby eliminating any unwanted lateral movement between upper assembly 180 and lower assembly 190.

In some examples, upper assembly 180 includes a cavity. In some examples, lower spring assembly 190 includes a protruding element, for example, one or more spring-biased tongues 482 connected to one or more biasing elements, for example, spring 452A and/or spring 452B. The one or more biasing elements may be disposed between a lower portion of the protruding element and a portion or wall of the lower assembly 190 or a portion or wall of a cavity formed in the lower assembly 190. The one or more biasing elements may be held in place or secured to the protruding element and/or a portion or wall of the lower assembly 190 or cavity of the lower assembly 190 by one or more features on the protruding element and/or portion or wall of the lower assembly 190 or cavity of the lower assembly 190. The one or more features may include for example, a protrusion about which a portion of the one or more biasing elements may be disposed, a depression into which the one or more biasing elements may be seated, or may include a clip, screw, or other connector known in the art.

One or more spring-biased tongues 482 may be configured to fit or extend into at least a portion of the cavity in the upper assembly. In some examples, upper assembly 180 includes a window configured to allow the user to view the cavity. In some examples, lower assembly 190 includes a window configured to allow the user to view the one or more spring-biased tongues. In some examples, upper assembly 190 does not include a cavity. One or more spring-biased tongues 482 may contact and push up on the bottom surface of upper assembly 190.

In some examples, upon an action performed on the release handle 385 or other manual actuator, pin 195 may be displaced into a position which does not block movement of the spring assembly 170, including upper assembly 180 and/or lower assembly 190. Once upper assembly 180 is released, springs 452A and 452B are free to expand, causing one or more spring-biased tongues 482 to push upwards against and/or into upper assembly 180, causing upper assembly 180 to be biased or displaced up middle frame member 120. Movement of the upper assembly 180 and/or lower assembly 190 up the middle frame member 120 causes other elements of the stroller frame to also move, for example, first side frame member 110A and second side frame member 110B may be pulled inward in response to movement of the upper assembly 180 and/or lower assembly 190 up the middle frame member 120. The resultant moment of the elements of the frame 10 along with the movement of the upper assembly 180 and/or lower assembly 190 up the middle frame member 120 may result in the collapsing or folding of the stroller frame 10 and/or stroller 30.

In some examples, the one or more spring-biased tongues 482 may be included in the upper assembly 180 and lower assembly 190 may include a cavity. In some examples both upper assembly 180 and lower assembly 190 comprise one or more spring-biased tongues 482. In some examples, one or more spring-biased tongues 482 is disposed substantially on a side of lower assembly 190, and a cavity may be correspondingly disposed substantially on a side of upper assembly 180. The biasing element or elements or spring or springs of one or more spring-biased tongues 482 may be covered, so as not to be exposed. In some examples, one or more spring-biased tongues 482 may be disposed substantially on the back of lower assembly 190, and a cavity may be correspondingly disposed substantially on the back of upper assembly 180. In some examples, upper assembly 180 and lower assembly 190 may be positioned substantially adjacent to foot pedal 160.

Figure 5:
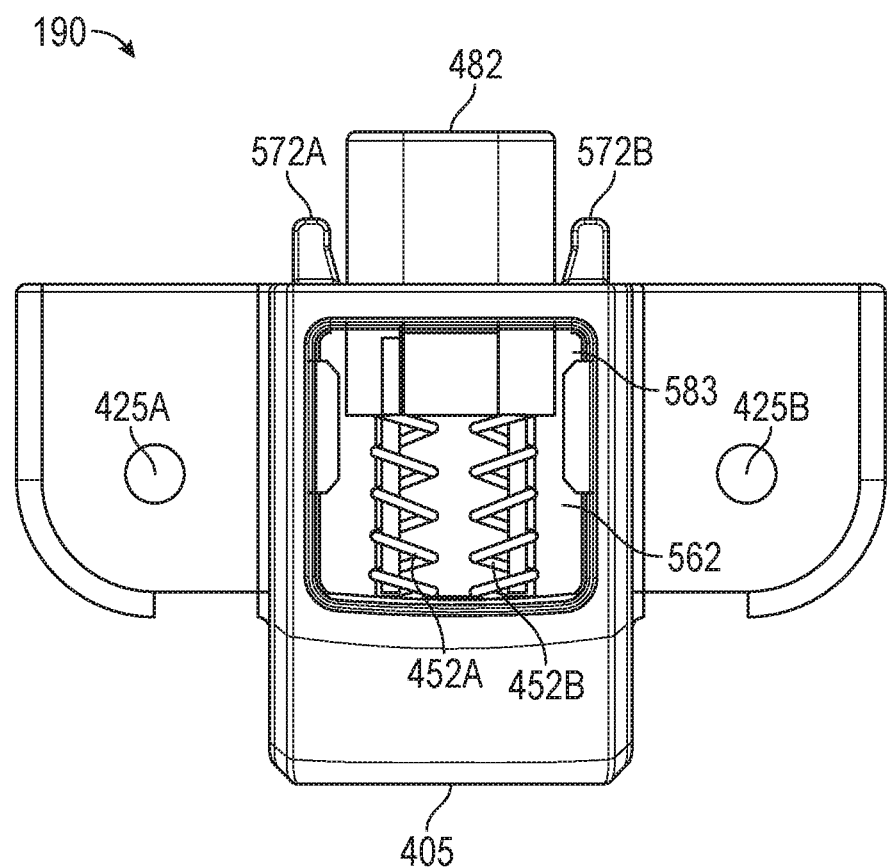
FIG. 5 is an elevational view of a portion of a sliding mechanism in accordance with some examples of the present disclosure.

FIG. 5 shows a partial cross-sectional view of an example of lower assembly 190. In some examples, lower assembly 190 comprises one or more spring-biased tongues 482 biased upward by a first spring 452A and second spring 452B disposed within a central housing 562. In some examples, one or more spring-biased tongues 482 may be connected to one spring. In some examples, one or more spring-biased tongues 482 may be connected to more than two springs. In some examples, the one or more spring-biased tongues 482 may be biased by a bellows part, compression spring, tension spring, leaf spring, torsion spring, or any other element that creates a biasing force. In some examples, one or more spring-biased tongues 482 may be biased by an elastomeric material. In some examples, central housing 562 includes a window 583 to allow the user to view the one or more spring-biased tongues 482, first spring 452A, and/or second spring 452B. Window 583 may be an aperture formed in the body of lower assembly. In some examples, window 583 may be rectangular, square, circular, triangular, and may be open or covered by a transparent or translucent material, for example by a plastic, glass, or resin.

In some examples, lower assembly 190 comprises first lower connecting channel 425A and second lower connecting channel 425B defined by apertures formed in side arm portions or connecting members of the lower assembly 190. First and second lower connecting channels 425A and 425B may facilitate a pivotable connection between lower assembly 190 and first and second support members 150A and 150B by receiving a rivet, screw, nut and bolt, pin, peg, ball and socket joint, or any form of connector known in the art. In some examples, first lever 572A and second lever 572B, which may be disposed on the top portion of lower assembly 190, are configured to fit into at least a portion of a corresponding cavity of upper assembly 180.

In some examples, upon pulling on the release handle 385, the pin 195 is pulled into the middle frame member 120. The springs attached to the one or more spring-biased tongues 482 of lower assembly 190 expand when pin 195 is pulled into middle frame member 195. The spring expansion causes one or more spring-biased tongues 482 to propel upper assembly 180 up middle frame member 120.

Figure 6A:
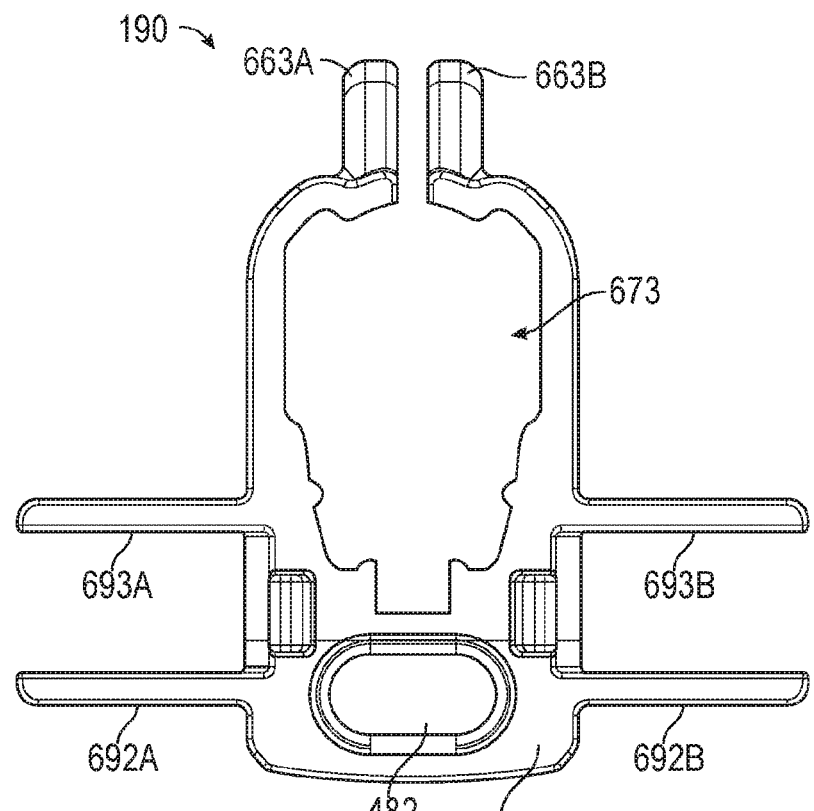
FIG. 6A is a plan view of a portion of a sliding mechanism in accordance with some examples of the present disclosure.
Figure 6B:
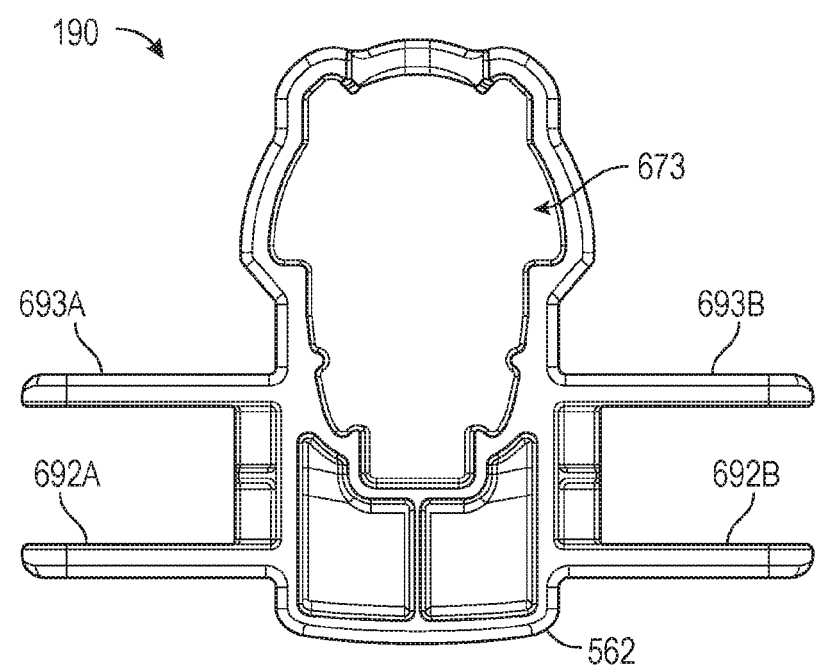
FIG. 6B is a plan view of a portion of a sliding mechanism in accordance with some examples of the present disclosure.

FIG. 6A shows a plan view of lower assembly 190, in some examples. First bracket members 692A and 693A connect lower assembly 190 to first support member 150A by way of a rivet, screw, nut and bolt, pin, peg, ball and socket joint, or any form of connector known in the art. Second bracket members 692B and 693B connect lower assembly 190 to second support member 150B by way of a rivet, screw, nut and bolt, pin, peg, or any form of connector known in the art. Middle frame member 120 and connecting member 165 may pass through recess 673. In some examples, first extender 663A and second extender 663B may be pulled apart to allow middle frame member 120 to slide into recess 673. As shown, for example, in FIG. 6A, one or more spring-biased tongues 482 may be disposed in and project upward from a recessed or hollow portion of lower assembly 190 which, in some examples, may generally be formed at the front of lower assembly 190 in central housing 562. FIG. 6B shows a plan view of lower assembly 190, in an alternative example, wherein one or more spring-biased tongues 482 may be omitted. In such examples, there may be no need for a recessed or hollow portion of lower assembly 190 for receiving such spring-biased tongues.

Figure 7:
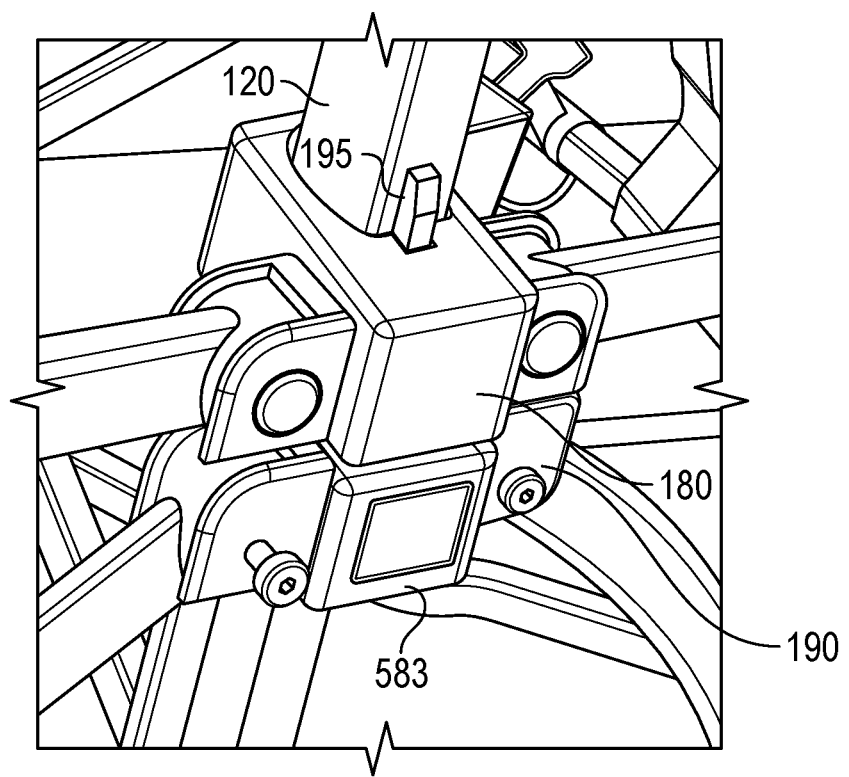
FIG. 7 is an isometric view of a sliding mechanism in accordance with some examples of the present disclosure.

FIG. 7 shows upper assembly 180 prohibited from moving up along frame member 120 by pin 195 protruding out of an opening in frame member 120. Protrusion of pin 195 prohibits the movement of upper assembly 180, preventing the collapsing of a stroller frame. When release handle 385 is actuated, the pin is retracted and upper assembly 180 may slide up frame member 120. Window 583 allows the user to view the position of one or more spring-biased tongues 482 and determine whether or not lower assembly 190 and upper assembly 180 are secured in a locked position.

Figure 8:
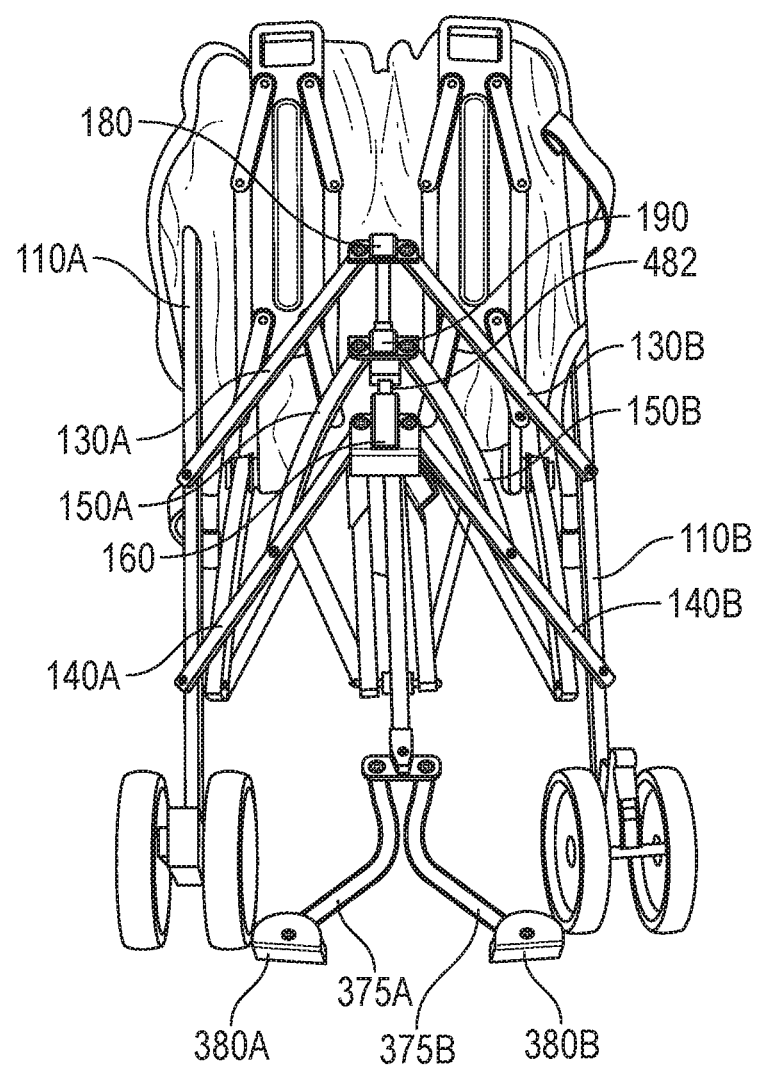
FIG. 8 is an elevational view of a stroller in a collapsed configuration in accordance with some examples of the present disclosure.

FIG. 8 shows an example of stroller frame 10 and/or stroller 30 in a collapsed state. In some examples, expansion of the springs within lower assembly 190 causes one or more spring-biased tongues 482 to push upwards upper assembly 180, causing upper assembly 180 to slide up middle frame member 120. Applying upward force to foot pedal 160 further facilitates the collapsing motion by applying an additional force to upper assembly 180 and lower assembly 190. In some examples, as upper assembly 180 slides up middle frame member 120, first upper cross frame member 130A and second upper cross frame member 130B may pivot upward. As lower assembly 190 slides up middle frame member 120, first support member 150A and second support member 150B may pivot upward. As foot pedal 160 slides up middle frame member 120, first lower cross member 140A and second lower cross member 140B may also pivot upward. Specifically, first lower cross member 140A may rotate upward around the connection between first lower cross member 140A and first side frame member 110A and may simultaneously rotate downward around the connection between first lower cross member 140A and foot pedal 160. Similarly, second lower cross member 140B may rotate upward around the connection between second lower cross member 140B and second side frame member 110B and may simultaneously rotate downward around the connection between second lower cross member 140B and foot pedal 160. In some examples, the pivoting motions may be facilitated by torsional springs at the intersection of first support member 150A and first lower cross frame member 140A and at the intersection of second support member 150B and second lower cross frame member 140B. Third support member 375A may hinge downward at pivot 380A, as first side frame member 110A is pulled closer to middle frame member 120 and fourth support member 375B may hinge downward at pivot 380B, as second side frame member 110B is pulled closer to middle frame member 120. In some examples, upper assembly 180 and lower assembly 190 may be separated from each other when the frame 10 and/or stroller 30 is in a collapsed state. In some examples, one or more spring-biased tongues 482 of lower assembly 190 may be at least partially disposed within the cavity of upper assembly 180 when the frame 10 and/or stroller 30 is in a collapsed state.

Referring again to FIGS. 3A-3B, in some examples, the pivoting action of first upper cross frame member 130A, second upper cross frame member 130B, first support member 150A, second support member 150B, first lower cross member 140A, and second lower cross member 140B, along with the hinging action of third support member 375A and fourth support member 375B, causes stroller frame 10 to collapse inward in a horizontal direction by causing first side frame member 110A and second side frame member 110B to be drawn inward toward middle frame member 120. In some examples, collapsing stroller frame 10 may also cause stroller 30 to collapse as well. For example, in some examples, as first side frame member 110A and second side frame member 110B are drawn inward toward middle frame member 120, first side front frame member 333A and second side front frame member 333B will likewise be drawn inward toward middle front frame member 334. In such examples, as the outer frame members (110A, 110B, 333A, and 333B) of stroller 30 collapse inward, first bottom cross frame member 342A, second bottom cross frame member 342B, third bottom cross frame member 342C, and fourth bottom cross frame member 342D may also collapse inwards towards the middle of stroller 30.

As the bottom cross frame members (342A, 342B, 342C, and 342D) collapse inward, one or more of first side front frame member 333A, second side front frame member 333B, and middle front frame member 334 may also be folded inward by allowing one or more of first side front frame member 333A, second side front frame member 333B, and middle front frame member 334 to bend inward at pivot elements 335A, 335B, and 336, respectively. In doing so, the lower portion of first side front frame member 333A, second side front frame member 333B, and middle front frame member 334 may, along with the front wheels of the stroller 30, be elevated and folded inwards towards stroller frame 10 as shown, for example, in FIG. 8.

In some examples, a user may expand frame 10 and stroller 30 by pressing down on foot pedal 160 when stroller 30 is in a collapsed position. Foot pedal 160 may then apply a downward force to mechanism 170, including upper assembly 180 and a lower assembly 190. The downward force on foot pedal 160 and mechanism 170 may then cause first upper cross frame member 130A, second upper cross frame member 130B, first support member 150A, second support member 150B, first lower cross member 140A, and second lower cross member 140B, along with third support member 375A and fourth support member 375B to pivot downward to an expanded position which, in some examples, may be generally horizontal. The pivoting action of the cross frame members and support members may also cause the outer frame members (110A, 110B, 333A, and 333B) of stroller 30 to expand outward to a fully expanded position. Likewise, first bottom cross frame member 342A, second bottom cross frame member 342B, third bottom cross frame member 342C, and fourth bottom cross frame member 342D may also expand outward toward the exterior of stroller 30 as shown, for example, in FIG. 3B. At the same time, first side front frame member 333A, second side front frame member 333B, and middle front frame member 334 may also be unfolded outward by allowing one or more of first side front frame member 333A, second side front frame member 333B, and middle front frame member 334 to return to a straightened state at pivot elements 335A, 335B, and 336, respectively. In doing so, the lower portion of first side front frame member 333A, second side front frame member 333B, and middle front frame member 334 may, along with the front wheels of the stroller 30, be lowered and unfolded outwards away from stroller frame 10 as shown, for example, in FIGS. 3A-B.

Figure 9:
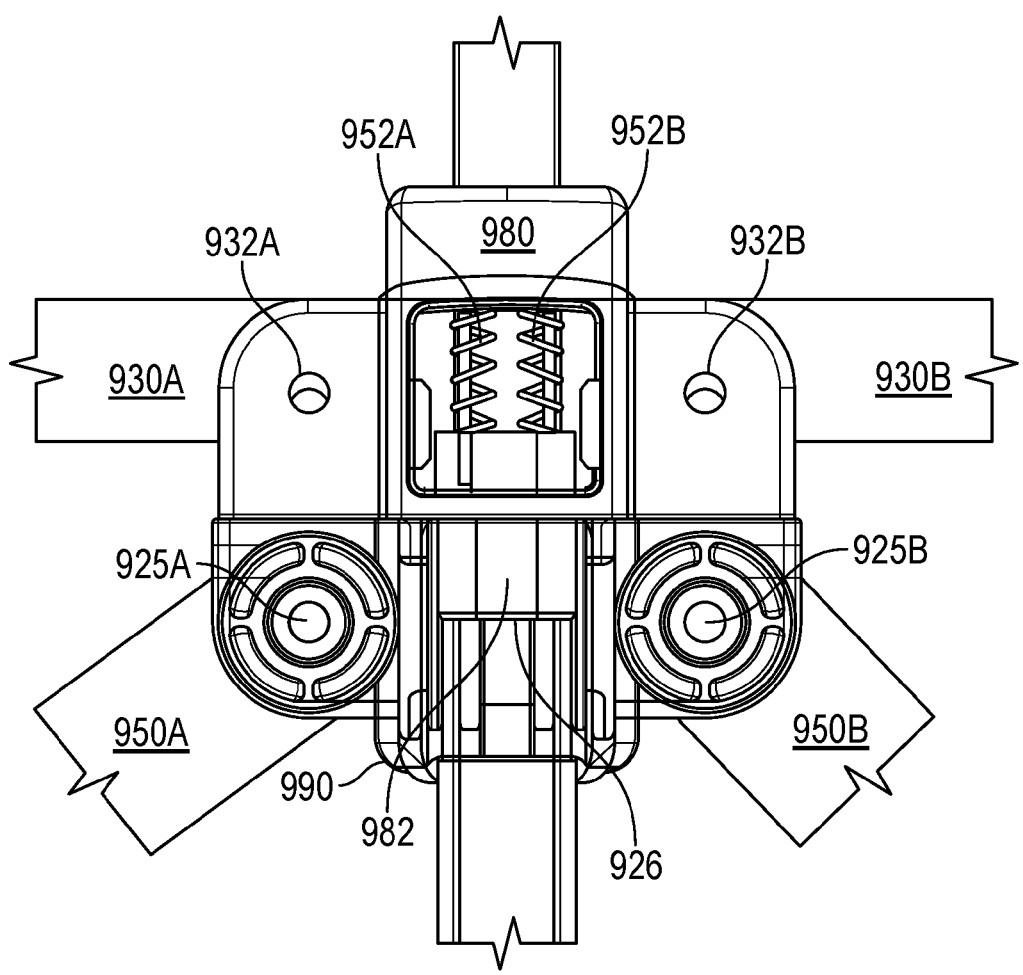
FIG. 9 is a partially cross-sectional view of a sliding mechanism in accordance with some examples of the present disclosure.

In some examples, as can be seen in FIG. 9, lower assembly 990 includes a cavity 926. In some examples, upper spring assembly 980 includes a protruding element, for example, one or more spring-biased tongues 982 connected to one or more biasing elements, for example, spring 952A and/or spring 952B. The one or more biasing elements may be disposed between an upper portion of the protruding element and a portion or wall of the upper assembly 980 or a portion or wall of a cavity formed in the upper assembly 980. The one or more biasing elements may be held in place or secured to the protruding element and/or portion or wall of the upper assembly 980 or cavity of the upper assembly 980 by one or more features on the protruding element and/or portion or wall of the upper assembly 980 or cavity of the lower assembly 990. The one or more features may include for example, a protrusion about which a portion of the one or more biasing elements may be disposed, a depression into which the one or more biasing elements may be seated, or may include a clip, screw, or other connector known in the art.

One or more spring-biased tongues 982 is configured to fit or extend into at least a portion of the cavity in the lower assembly. In some examples, upper assembly 980 includes a window configured to allow the user to view the cavity. In some examples, upper assembly 980 includes a window configured to allow the user to view the one or more spring-biased tongues.

Figure 10:
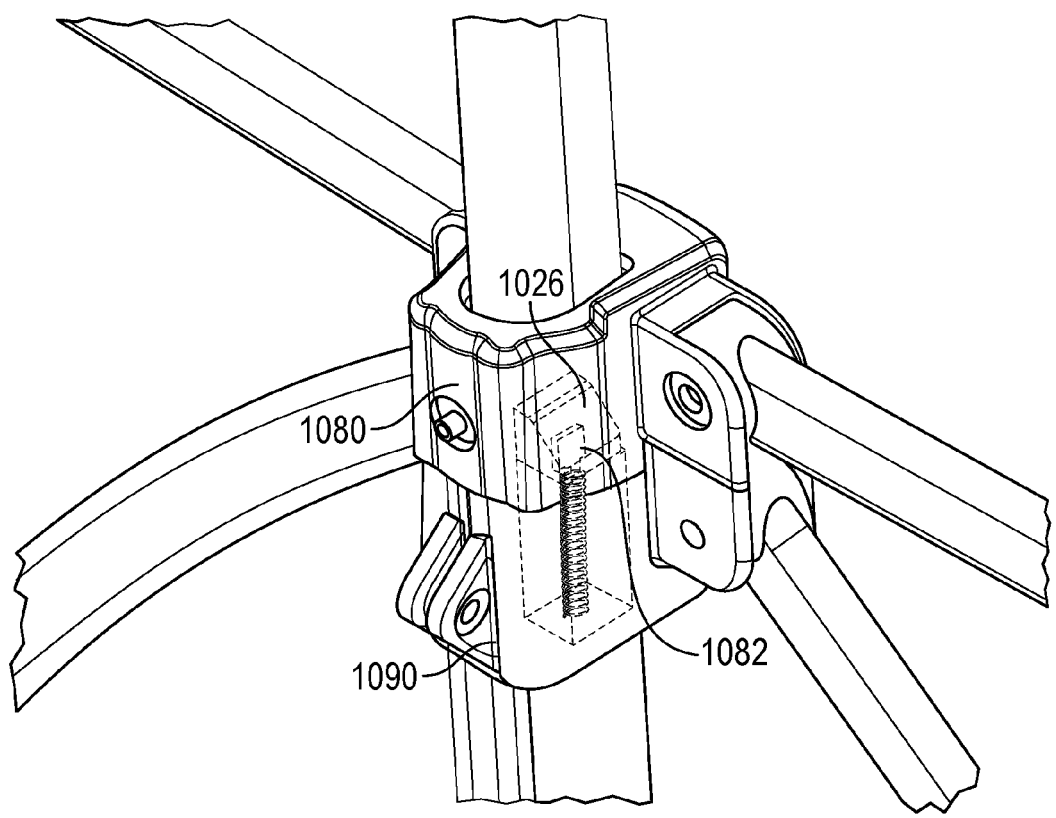
FIG. 10 is an isometric view of a sliding mechanism in accordance with some examples of the present disclosure.

In some examples, as can be seen in FIG. 10, one or more spring-biased tongues 1082 can be positioned substantially on a side of lower assembly 1090. A cavity 1026 can be positioned substantially on a side of upper assembly 1080, such that one or more spring-biased tongues 1082 is configured to fit or extend into at least a portion of cavity 1026.

Figure 11:
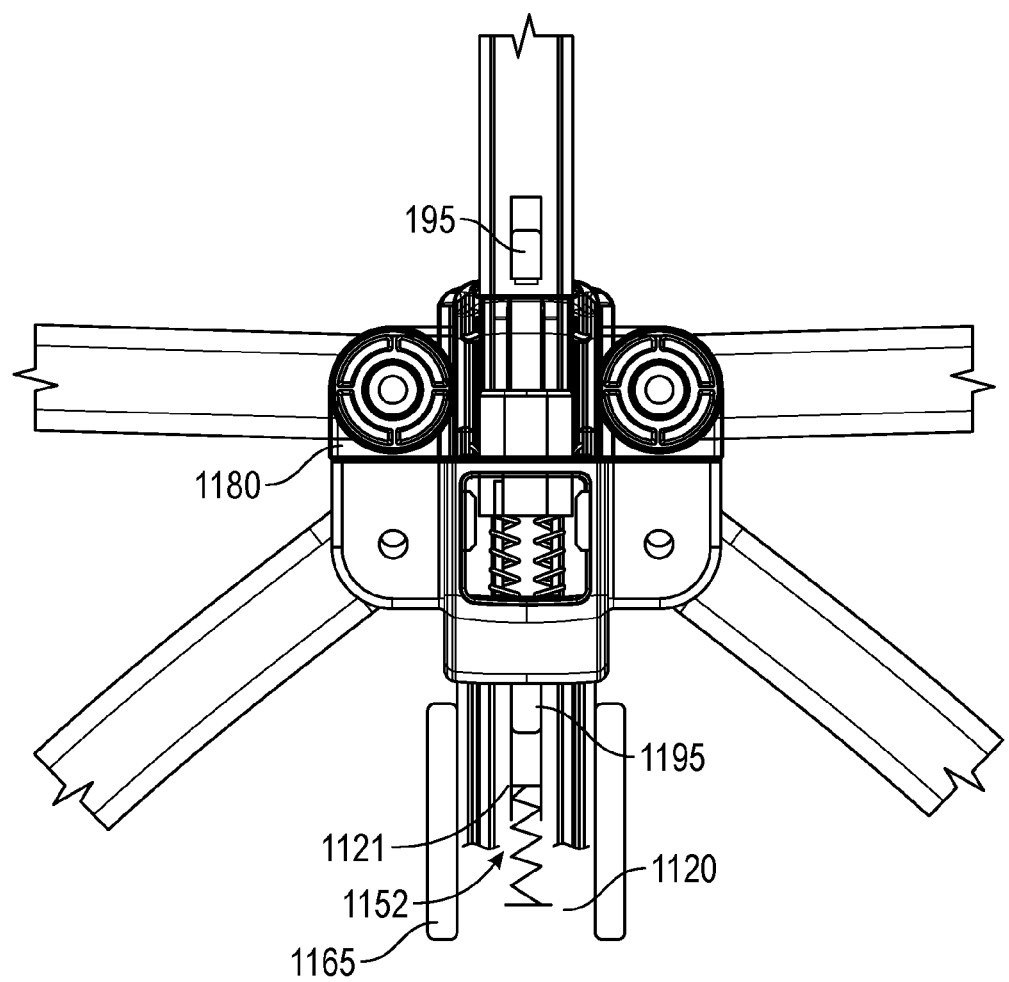
FIG. 11 is an isometric view of a sliding mechanism in accordance with some examples of the present disclosure.

In some examples, as can be seen in FIG. 11, a spring mechanism may be positioned, for example, within a frame member such as middle frame member 120. A carriage mechanism 1121 may be positioned above the spring 1152. A propulsion pin 1195 may be connected to the carriage mechanism 1121, and may protrude from an opening in middle frame member 1120. Pin 195 may be pulled into middle frame member 120, by way of a connecting member attached to a release handle, for example. When pin 195 is released, spring 1152 expands from its compressed state, and propulsion pin 1195 moves lower assembly 190 up middle frame member 120, and facilitates collapsing of the stroller frame.

Figure 12:
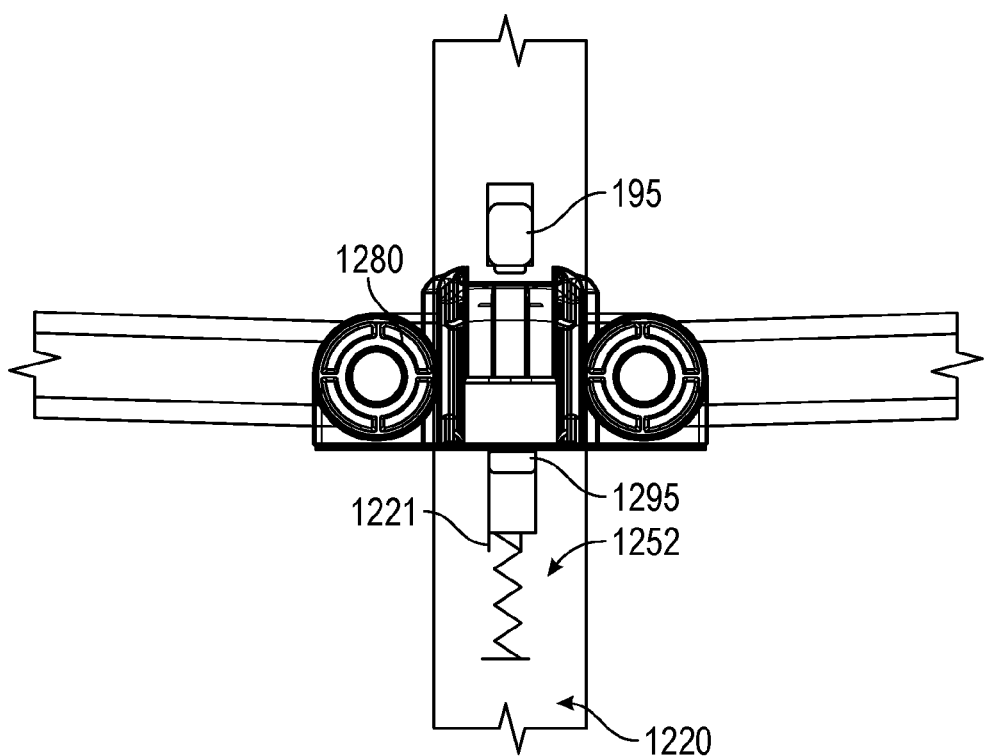
FIG. 12 is an elevational view of a sliding mechanism in accordance with some examples of the present disclosure.

In some examples, as can be seen in FIG. 12, a spring mechanism may be positioned, for example, within a frame member such as middle frame member 120. A carriage mechanism 1221 may be positioned above spring 1252. A pin 1295 may be connected to carriage mechanism 1221, and may protrude from an opening in middle frame member 120. Pin 195 may be pulled into middle frame member 120, by way of a connecting member attached to a release handle, for example. When pin 195 is released, spring 1252 expands from its compressed state, and propulsion pin 1295 moves upper assembly 180 up middle frame member 120 and facilitates collapsing of the stroller frame.

Figure 13:
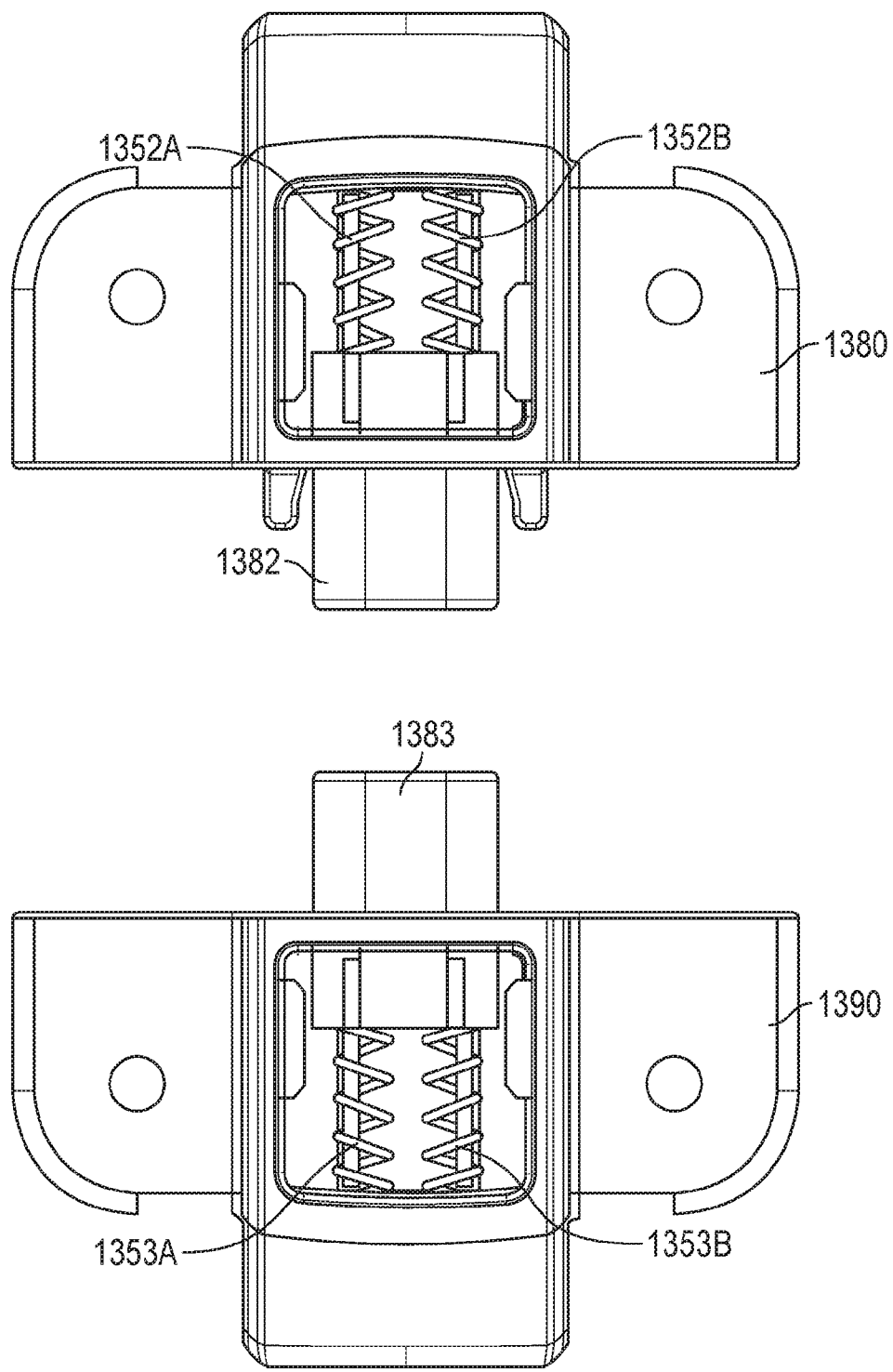
FIG. 13 is an isometric view of a sliding mechanism in accordance with some examples of the present disclosure.

In some examples, as can be seen in FIG. 13, upper assembly 1380 can include one or more spring-biased tongues 1382 and lower assembly 1390 can include one or more spring-biased tongues 1383. When the stroller is in a fully locked state, the springs 1352A, 1352B attached to one or more spring-biased tongues 1382 and the springs 1353A, 1353B attached to one or more spring-biased tongues 1383 are compressed. Upon initiation of the collapsing motion, the springs 1352A, 1352B, 1353A, and 1353B expand, causing one or more spring-biased tongues 1382 and one or more spring-biased tongues 1383 to collide, propelling upper assembly 1380 upwards along middle frame member.

Figure 14A:
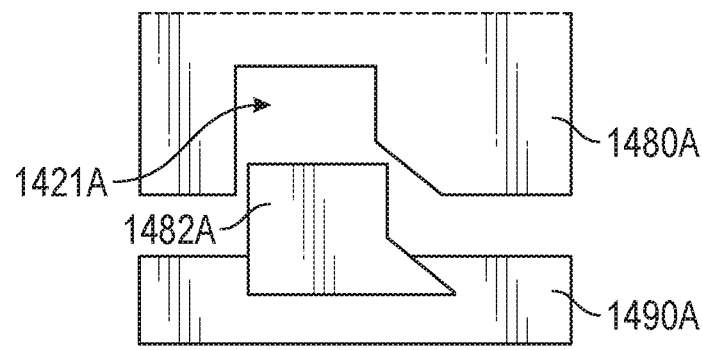
FIG. 14 shows elevational views of spring-biased tongues and corresponding cavities in accordance with some examples of the present disclosure.
Figure 14B:
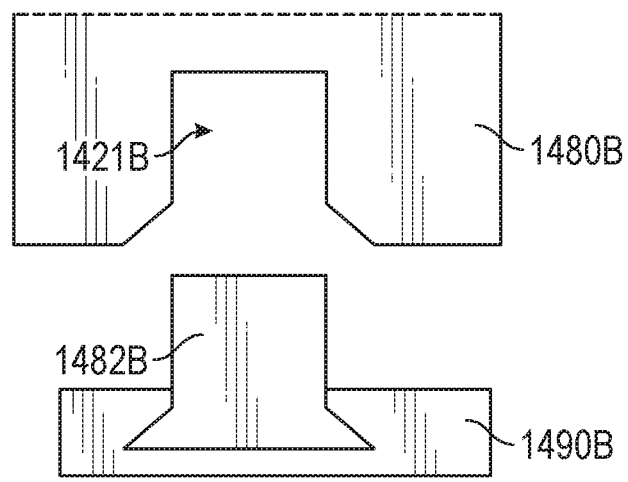
Figure 14C:
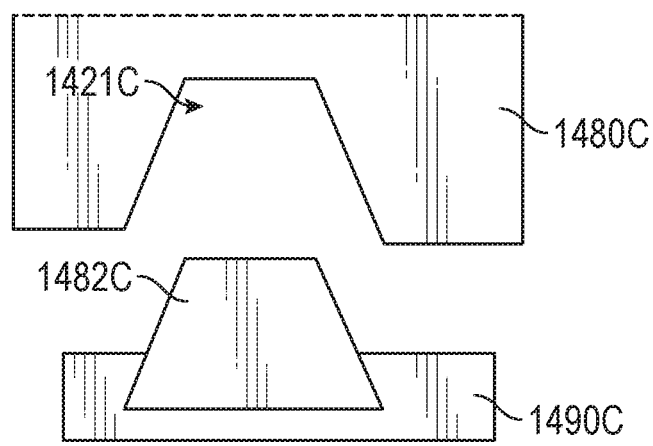

In some examples, as can be seen in FIG. 14, the cavity 1421 of upper assembly 1480 and one or more tongues 1482 of lower assembly 1490 may be configured in different shapes. For example, the cavity 1421 of upper assembly 1480 and one or more tongues 1482 of lower assembly 1490 may be tapered, as in FIG. 14C, or include interlocking features that are configured to counter relative sliding between the parts when engaged, as shown, for example, in FIGS. 14A-14B. This interlocking may help to stiffen the frame.

Figure 15:
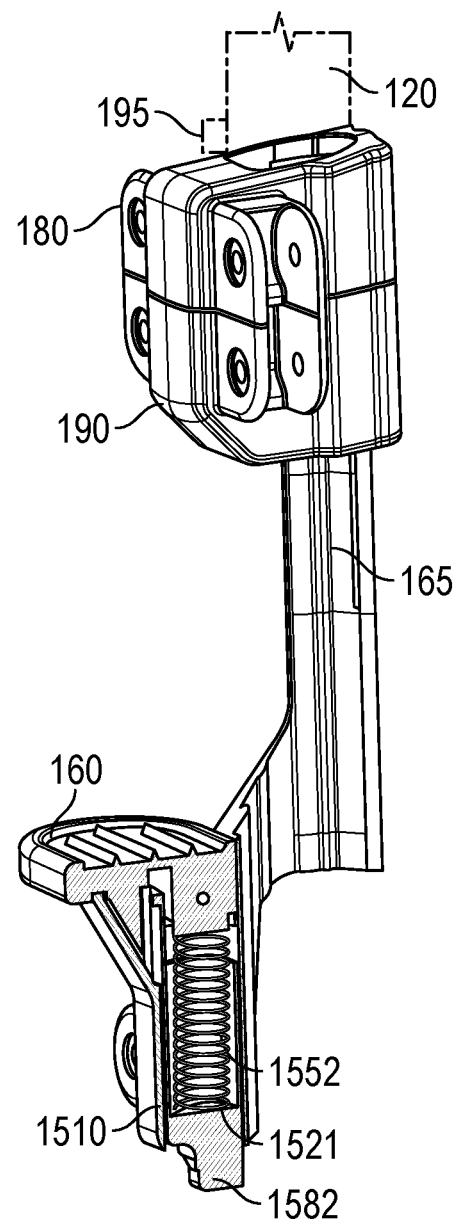
FIG. 15 shows an isometric view of a portion of a stroller frame, a sliding mechanism, and a foot pedal in accordance with some examples of the present disclosure

In some examples, as can be seen in FIG. 15, a spring mechanism 1552 is positioned within a cavity 1521 positioned below foot pedal 160. Foot pedal 160 may be connected to connecting member 165, which may be connected to upper assembly 180. Connecting member 165 may also be connected to a plunger side wall 1510. In a locked position, a lower surface of the upper assembly 180 may be disposed flush against an upper surface of the lower assembly 190. In other examples, there may be a gap between a lower surface of the upper assembly 180 and an upper surface of the lower assembly 190 even when the upper assembly 180 fully engages the lower assembly 190. Spring mechanism 1552 may be connected to a plunger 1582.

A locking or retaining member, for example, pin 195, when engaged or disposed in a locking position and/or an extended position, prohibits the upward movement of upper assembly 180 along middle frame member 120. When pin 195 is not engaged or disposed in a locking position and/or an extended position, one or both of the upper assembly 180 and the lower assembly 190 may move upwards along middle frame member 120 to facilitate the folding or collapse of the stroller.

Figure 16:
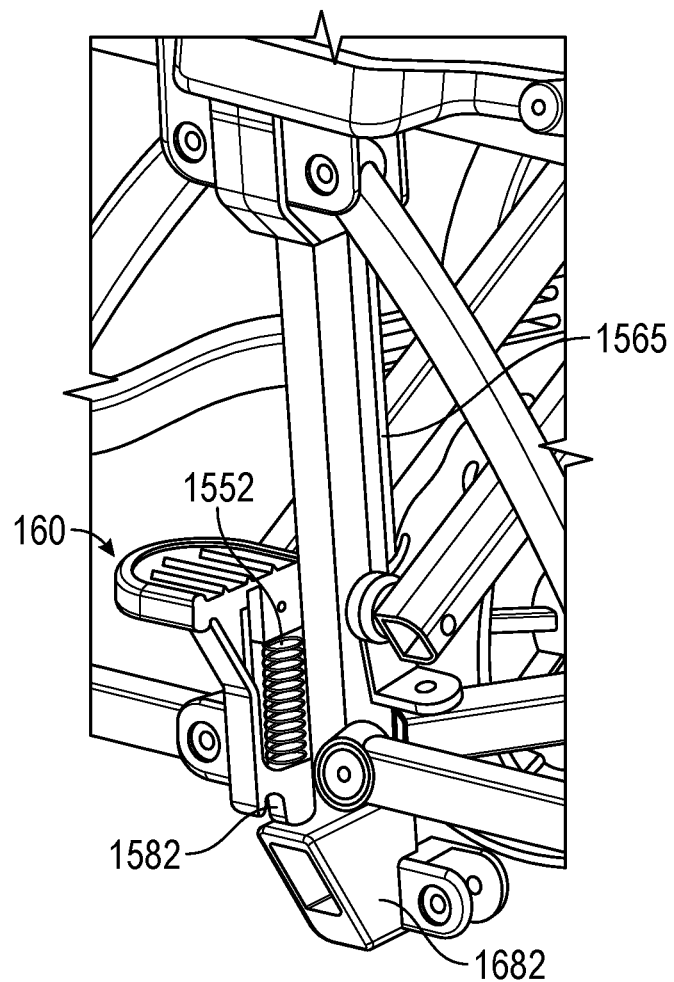
FIG. 16 shows an isometric view of a portion of a stroller frame, a sliding mechanism, and a foot pedal in accordance with some examples of the present disclosure.

When pin 195 is engaged or disposed in a locking position, plunger 1582 pushes down on a shelf 1682, attached to middle frame member 120, as can be seen in FIG. 16. Spring mechanism 1582 may be in a compressed state. When pin 195 is released, spring mechanism 1552 expands from its compressed state. Connecting member 156 propels up middle frame member 120, pushing upper assembly 180 up middle frame member 120, and facilitates collapsing of the stroller frame. An upward motion and/or a force applied to a manual actuator, for example, foot pedal 160, may further facilitate the upward motion of the connecting member 165 and one or both of the upper assembly 180 and the lower assembly 190. Under the influence of the applied force or upward motion of the manual actuator, one or both of the upper assembly 180 and the lower assembly 190 slide up middle frame member 120. The stroller thereafter collapses or folds into an at least partially collapsed or folded configuration.

Having thus described several aspects of at least one embodiment of this disclosure, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A foldable stroller frame comprising:
   a first side frame member
   a second side frame member;
   a middle frame member;
   a sliding mechanism that slides along said middle frame member, said sliding mechanism including an upper portion and a lower portion which each slide along the middle frame member, a lower surface of the upper portion being disposed against an upper surface of the lower portion when the stroller frame is in an expanded state, the upper portion and the lower portion being separated from one another when the stroller frame is in a collapsed state, the lower surface of the upper portion of the sliding mechanism including a cavity and the lower portion of the sliding mechanism including a spring-biased tongue that extends into the cavity;
   a first cross frame member connecting said sliding mechanism to said first side frame member; and
   a second cross frame member connecting said sliding mechanism to said second side frame member.

2. The foldable stroller frame of claim 1, further comprising a foot pedal that slides along said middle frame member.

3. The foldable stroller of frame of claim 2, wherein said foot pedal is connected to said upper portion of the sliding mechanism.

4. The foldable stroller frame of claim 1, further comprising a retractable pin disposed on said middle frame member, said retractable pin impeding movement of said sliding mechanism on said middle frame member when said retractable pin is in an extended position.

5. The foldable stroller frame of claim 4, further comprising a release handle, the pin being disengaged when a force is applied to the release handle.

6. The foldable stroller frame of claim 3, further comprising a third cross frame member connecting said foot pedal to said first side frame member and a fourth cross frame member connecting said foot pedal to said second side frame member.

7. The foldable stroller frame of claim 6, wherein at least one of said third and said fourth cross frame members comprises a curved portion at the connection with said first or second side frame members.

8. The foldable stroller frame of claim 7, further comprising a first support frame member connecting said sliding mechanism to said third cross frame member and a second support frame member connecting said sliding mechanism to said fourth cross frame member.

9. The foldable stroller frame of claim 8, wherein said first and second cross frame members connect to said upper portion of said sliding mechanism and said first and second support members connect to the lower portion of said sliding mechanism.

10. The foldable stroller frame of claim 9, wherein said first, second, third, and fourth cross frame members form an obtuse angle from vertical with said middle frame member when said foldable stroller frame is in an expanded position.

11. A foldable stroller comprising:
   a first side frame member
   a second side frame member;
   a middle frame member;
   a sliding mechanism that slides along said middle frame member, the sliding mechanism comprising two separate parts, the two separate parts comprising an upper part and a lower part, the upper part of the sliding mechanism including a cavity and the lower part of the sliding mechanism includes a spring-biased tongue that extends into the cavity;

a first cross frame member connecting said sliding mechanism to said first side frame member;

a second cross frame member connecting said sliding mechanism to said second side frame member;

a foot pedal that slides along said middle frame member and is connected to said sliding mechanism; and a third cross frame member connecting said first side frame member to said foot pedal and a fourth cross frame member connecting said second side frame members to said foot pedal.

12. The foldable stroller of claim 11, further comprising a first support frame member connecting said third cross frame member to the lower part of said sliding mechanism and a second support frame member connecting said fourth cross frame member to the lower part of said sliding mechanism.

13. The foldable stroller of claim 12, wherein said first and said second cross frame members connect to said upper part of said sliding mechanism.

14. The foldable stroller of claim 13, wherein at least one of said first, second, third, or fourth cross frame members comprises a curved portion at the connection with said first or said second side frame members.

15. The foldable stroller of claim 14, wherein said at least one frame member includes a retractable pin that impedes movement of said sliding mechanism when said retractable pin is in an extended position.

16. The foldable stroller of claim 15, further comprising an actuator, said pin being disengaged when a force is applied to said actuator.

17. A foldable stroller frame comprising:
a first side frame member;
a second side frame member;
a middle frame member;
a sliding mechanism that slides along said middle frame member;
wherein the sliding mechanism has an upper portion and a lower portion, and wherein said lower portion has at least one spring-biased tongue that applies a biasing force to said upper portion;
a first cross frame member connecting said upper portion of the sliding mechanism to said first side frame member; and
a second cross frame member connecting said upper portion of the sliding mechanism to said second side frame member.

18. The stroller of claim 17, further comprising a cavity defined in said upper portion, said at least one spring-biased tongue extending into at least a portion of said cavity.

19. The stroller of claim 18 further comprising a foot pedal that slides along said middle frame member.

20. The mechanism of claim 19, wherein said foot pedal is connected to said upper portion of said sliding mechanism.

21. The foldable stroller of claim 1, wherein at least one of said first and second cross frame members comprises a curved portion at the connection with said first or second side frame members.

* * * * *